(12) United States Patent
Kim et al.

(10) Patent No.: US 12,486,944 B2
(45) Date of Patent: Dec. 2, 2025

(54) APPARATUS FOR DISPLAY DEVICE

(71) Applicant: SAMSUNG ELECTRONICS CO., LTD., Suwon-si (KR)

(72) Inventors: Eunah Kim, Suwon-si (KR); Jihae Lim, Suwon-si (KR); Chulyong Cho, Suwon-si (KR); Hyeeun Park, Suwon-si (KR); Soyon You, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/143,175

(22) Filed: May 4, 2023

(65) Prior Publication Data

US 2023/0272877 A1 Aug. 31, 2023

Related U.S. Application Data

(63) Continuation of application No. PCT/KR2021/014430, filed on Oct. 18, 2021.

(30) Foreign Application Priority Data

Nov. 4, 2020 (KR) .................. 10-2020-0146339

(51) Int. Cl.
*F16M 13/02* (2006.01)
*H04N 5/655* (2006.01)

(52) U.S. Cl.
CPC .......... *F16M 13/022* (2013.01); *H04N 5/655* (2013.01)

(58) Field of Classification Search
CPC .................. F16M 13/022; H04N 5/655
See application file for complete search history.

(56) References Cited

U.S. PATENT DOCUMENTS 2,697,572 A * 12/1954 Pfankuch ............... A47G 1/202
248/295.11
6,464,195 B1 * 10/2002 Hildebrandt .......... G06F 1/1683
248/920
6,554,242 B2 * 4/2003 Kim ........................ F16M 11/10
211/100

(Continued)

FOREIGN PATENT DOCUMENTS

JP 2010-193418 9/2010
KR 10-2005-0028518 3/2005

(Continued)

OTHER PUBLICATIONS

Extended European Search Report dated Feb. 23, 2024 for corresponding application 21889424.4.

(Continued)

*Primary Examiner* — Monica E Millner
(74) *Attorney, Agent, or Firm* — STAAS & HALSEY LLP

(57) ABSTRACT

An apparatus for the display device includes an upper frame; and a lower frame arrangeable to be spaced apart from the upper frame. The upper frame including: a first mounting portion coupleable to an upper portion of the display device, and a second mounting portion coupleable to an upper portion of an accessory device. The lower frame includes a first mounting portion coupleable to a lower portion of the display device, and a second mounting portion coupleable to a lower portion of the accessory device.

15 Claims, 20 Drawing Sheets

(56) References Cited

U.S. PATENT DOCUMENTS

| | | | |
|---|---|---|---|
| 6,604,722 B1* | 8/2003 | Tan | F16M 13/02 254/122 |
| 6,886,701 B2* | 5/2005 | Hong | F16M 11/10 211/104 |
| 7,097,143 B2* | 8/2006 | Kim | F16M 11/2092 248/922 |
| 7,345,870 B2* | 3/2008 | Shin | F16M 13/02 248/920 |
| 8,203,854 B2* | 6/2012 | Tsai | F16M 13/02 248/327 |
| 8,375,648 B1 | 2/2013 | O'Sullivan | |
| 9,110,631 B2* | 8/2015 | Oakley | G06F 1/1624 |
| 12,055,974 B2* | 8/2024 | Liao | H05K 7/14 |
| 2005/0061937 A1 | 3/2005 | Kim | |
| 2005/0200765 A1 | 9/2005 | Sanchez | |
| 2007/0221807 A1* | 9/2007 | Park | F16M 11/2014 248/324 |
| 2010/0183186 A1 | 7/2010 | Noguchi et al. | |
| 2014/0192270 A1 | 7/2014 | Park et al. | |
| 2014/0247612 A1 | 9/2014 | Hochman | |
| 2021/0068543 A1* | 3/2021 | Yoon | F16M 13/02 |
| 2021/0072788 A1 | 3/2021 | Kim et al. | |

FOREIGN PATENT DOCUMENTS

| | | |
|---|---|---|
| KR | 10-2005-0088043 | 9/2005 |
| KR | 10-2005-0092162 | 9/2005 |
| KR | 10-2009-0075182 | 7/2009 |
| KR | 10-2011-0087914 | 8/2011 |
| KR | 10-2014-0090052 | 7/2014 |
| KR | 20-0477662 | 7/2015 |
| KR | 10-2017-0051977 | 5/2017 |
| KR | 10-2050293 | 11/2019 |
| KR | 10-2020-0054062 | 5/2020 |
| KR | 10-2135535 | 7/2020 |
| KR | 20-0492464 | 10/2020 |

OTHER PUBLICATIONS

International Search Report dated Feb. 10, 2022 in International Patent Application No. PCT/KR2021/014430 (3 pages; 2 pages English translation).
Written Opinion dated Feb. 10, 2022 in International Patent Application No. PCT/KR2021/014430 (5 pages).
Korean Office Action dated Jun. 2, 2025 for Korean Application No. 10-2020-0146339.

* cited by examiner

APPARATUS FOR DISPLAY DEVICE

CROSS-REFERENCE TO RELATED APPLICATION(s)

This application is a continuation application, under 35 U.S.C. § 111(a), of International Application No. PCT/KR2021/014430, filed on Oct. 18, 2021, in the Korean Intellectual Property Office and is based on and claims priority to Korean Patent Applications No. 10-2020-0146339 filed on Nov. 4, 2020, in the Korean Intellectual Property Office, the disclosures of which are incorporated by reference herein in their entirety.

BACKGROUND

FIELD

The disclosure relates to an apparatus for a display device, which is related to installation and use of the display device, and more particularly to an apparatus for a display device, which is used when the display device is installed on a vertical installation surface such as a wall.

DESCRIPTION OF RELATED ART

A display device collectively refers to an electronic device that includes a display panel to provide a screen for displaying an image. Various types of display devices have been used in a variety of fields. In the field of small devices, there are a smartphone, a tablet PC, and the like mobile devices. In the field of medium and large devices, there are a TV, a monitor, an electronic blackboard, a digital signage, etc. For example, in the case of the TV being widely used at home, the TV of which the main body was supported on a stand was often used as being put on a table in a living room. However, as the screen of the TV becomes larger, there is an increasing trend of supporting the TV by mounting the TV on a wall rather than using the stand. To support TV on the wall, a mounting frame made of metal or the like is used. Such a mounting frame is first coupled to the wall, and then the TV is mounted to the mounting frame, thereby resulting in mounting the TV to the wall.

However, a conventional mounting frame is provided corresponding to a TV having a specific size, and therefore not usable for a TV having a different size. To mount a TV having a predetermined size to the wall, a dedicated mounting frame for the TV having that size is needed. Typically, the size of a TV refers to a diagonal length of a screen. For example, a mounting frame for a 43-inch TV is not usable for a 65-inch TV.

Further, around the TV mounted to the wall, additional interior accessories or peripherals may be used together for various reasons (aesthetic, expansion of functions, etc.). To mount such accessories or peripherals around the TV, a dedicated mounting frame prepared for those accessories or peripherals is required.

Accordingly, taking the foregoing matters into account, there may be required an apparatus for a display device, which includes a mounting frame to not only support display devices having various sizes through one type of a structure but also mount the accessories or peripherals along with the TV to the wall.

SUMMARY

According to an embodiment of the disclosure, an apparatus for a display device includes: an upper frame including a first mounting portion coupleable to an upper portion of the display device, and a second mounting portion coupleable to an upper portion of an accessory device; and a lower frame arrangeable to be spaced apart from the upper frame, the lower frame including: a first mounting portion coupleable to a lower portion of the display device, and a second mounting portion coupleable to a lower portion of the accessory device.

Further, the apparatus may further include a device bracket including a first end coupleable to the display device, and a second end coupleable to the first mounting portion of the upper frame.

Further, the device bracket may include: a bracket main body forming a device coupling portion fastenable to the upper frame by a screw to allow the display device to be coupled to the upper frame while the screw is passed along a hole of a rear surface of the display device, and a bracket mounting portion coupleable to an end portion of the bracket main body and coupleable to the first mounting portion of the upper frame such that while the bracket mounting portion is coupled, the bracket mounting portion is rotatable.

Further, the first mounting portion of the upper frame may be shaped as a hook, and the bracket mounting portion may be shaped as a ring to allow the first mounting portion of the upper frame to be hooked.

Further, the upper frame or the lower frame may include: a frame main body; and a spacer protruding from the frame main body to form a space between the frame main body and the display device.

Further, the upper frame or the lower frame may further include a frame bending portion bent from the spacer to cover a horizontal edge of the display device.

Further, the accessory device may include: a first accessory member supportable on the second mounting portion and including a first coupling portion; and a second accessory member including a second coupling portion coupleable to and decoupleable from the first coupling portion of the first accessory member.

Further, the first coupling portion of the first accessory member may include a magnet coupleable to a surface thereof, and the second coupling portion of the second accessory member may include a metal material to be attached to the magnet.

Further, the second accessory member may include a mark that represents identification information of the accessory device.

Further, the upper frame may be arranged at a first position corresponding to an upper edge of the display device, and the lower frame may be arranged at a second position corresponding to a lower edge of the display device, and the upper frame and the lower frame may be arranged to have up and down symmetry.

Further, the upper frame and the lower frame are spaced apart by a distance that may correspond to a vertical length of the display device.

Further, the apparatus may further include one or more bars supportable on the upper frame and the lower frame, and adjustable in length corresponding to a vertical length of the display device.

Further, the apparatus may further include a device bracket coupleable to the display device, the device bracket including: a bracket main body coupleable to a rear surface of the display device, and a bracket mounting portion having a length corresponding to a vertical length of the display device, and including opposite ends supportable on the upper frame and the lower frame, respectively.

Further, the upper frame or the lower frame may include holes using which the upper frame or the lower frame is coupleable to a wall by screws.

Further, the upper frame or the lower frame may be extended along a horizontal direction, and the first mounting portion of the upper frame or the first mounting portion of the lower frame, or the second mounting portion of the upper frame or the second mounting portion of the lower frame may be spaced apart to have bilateral symmetry on the upper frame or the lower frame relative to each other.

Further, the display device may be further provided, and the display device may include a display, and a processor to process an image corresponding to identification information of the accessory device to be displayed on the display.

Further, the accessory device may include at least one of a decorative plate, a loudspeaker, or an auxiliary display device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
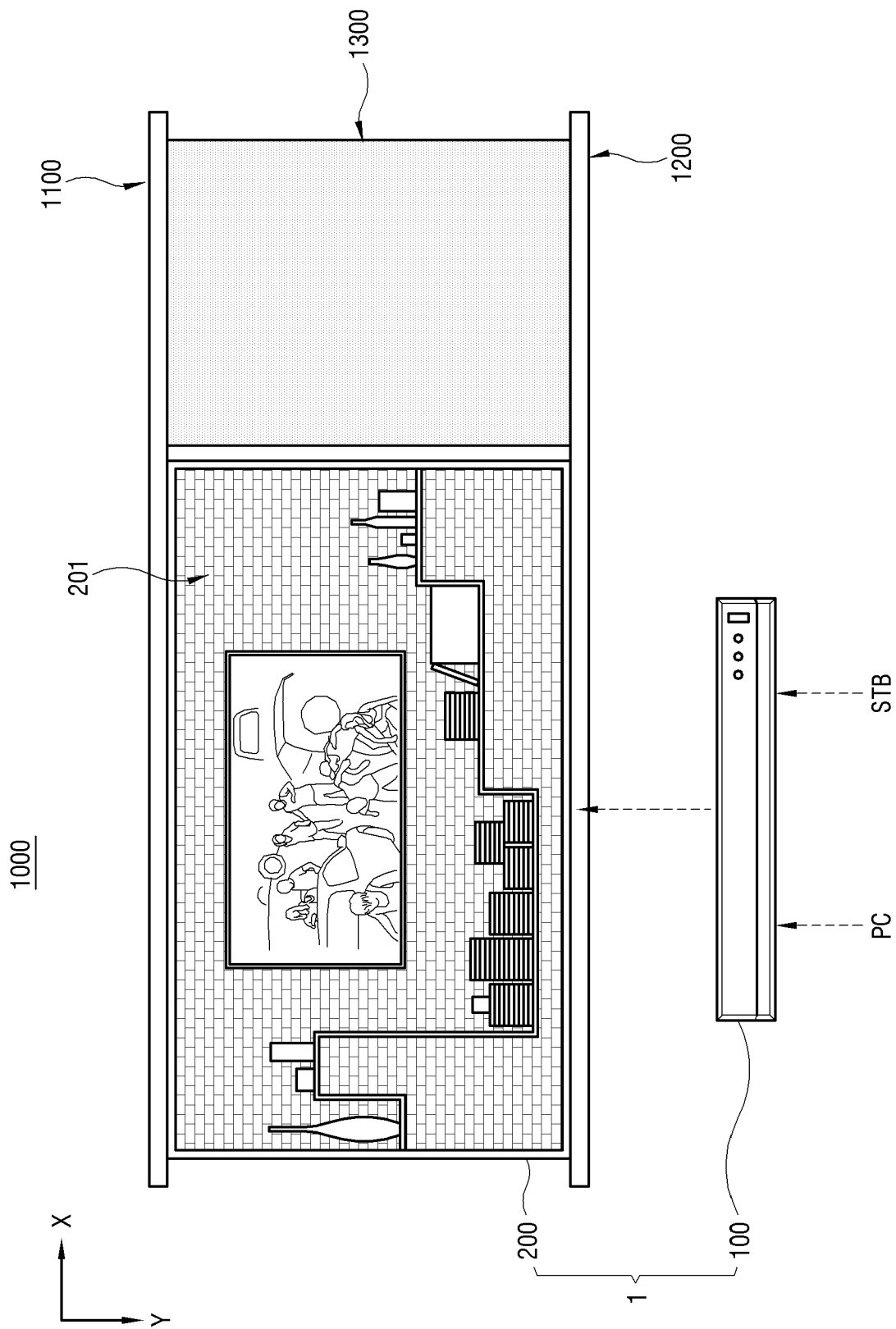
FIG. 1 illustrates an example of an apparatus for a display device according to an embodiment of the disclosure.

FIG. 1 illustrates an example of an apparatus for a display device

As show in FIG. 1, an apparatus for a display device 1 according to an embodiment includes frames 1100 and 1200, and an accessory device 1300. The frames 1100 and 1200 are provided to couple with a vertical wall or the like installation surface, and provided to support the display device 1 and an accessory device 1300 while coupling with the installation surface. Thus, the frames 1100 and 1200 allow the display device 1 and the accessory device 1300 to be supported together on the installation surface.

In the accompanying drawings, the direction of X is defined as a horizontal direction, and the direction of Y is defined as a vertical direction. Although it is not shown, the direction of Z is defined as a direction from a wall toward the front. In the following embodiments, such definitions will be used.

The display device 1 may for example be implemented by a TV. Alternatively, the display device 1 may be implemented by various devices capable of displaying an image on a screen 201, such as a monitor, a digital signage, an electronic blackboard, and an electronic frame, in addition to the TV. According to installation types, the display device 1 may be installed with upper and lower edges thereof disposed in a horizontal direction or in a vertical direction. In the accompanying drawings, the display device 1, of which the upper and lower edges are disposed in the horizontal direction, is mounted to the frames 1100 and 1200. However, there are no limits to the installation type of the display device 1. According to the installation types of the frames 1100 and 1200, the display device 1, of which the upper and lower edges are disposed in the vertical direction, may also be mounted to the frames 1100 and 1200. Furthermore, the frames 1100 and 1200 may be adapted to various display devices 1 corresponding to various sizes of screens.

The display device 1 is divided into an image processing device 100 that processes an image signal based on image content received from the outside or stored therein device 100, and a display 200 that displays an image based on the image signal output from the image processing device 100. In the case of the display device 1 having such a divisional structure, the display 200 is mounted to the frames 1100 and 1200. On the other hand, in the case of the display device 1 having a single entity structure of which the image processing device 100 and the display 200 are not separated but accommodated in one housing, the entire display device 1 is mounted to the frames 1100 and 1200.

The image processing device 100 receives an image signal by various communication methods such as performing short range communication with various external apparatuses such as a personal computer (PC), a set-top box, a game console, and a multimedia player; performing a wide area network (WAN) communication with a server; or receiving a radio frequency (RF) broadcast signal. Alternatively, the image processing device 100 may obtain image content data stored in a built-in storage. The image processing device 100 performs decoding, scaling, and the like image-related processing with regard to the obtained image signal and outputs the processed image signal to the display 200. Both wired and wireless methods may be used for signal transmission between the image processing device 100 and the display 200.

The display 200 forms the screen 201 to display an image based on an image signal from the image processing device 100. The display 200 includes a display panel, and various design methods may be applied to the structure of the display panel. For example, the display 200 may include a single display panel, and a backlight unit to emit light the display panel. Alternatively, the display 200 may have a structure where a plurality of micro light emitting diode (LED) modules are combined in the form of tiles to form a large screen 201.

Meanwhile, the accessory device 1300 may be provided as various types of devices according to purposes. For example, the accessory device 1300 may include accessory plates on which various images are printed for aesthetics, or various types of electronic devices such as a loudspeaker or a display device. Here, the outer appearance of the accessory device 1300 may look like a rectangular plate so as to be aligned with the display device 1 side by side while being mounted to the frames 1100 and 1200. Details of the accessory device 1300 will be described later.

In this embodiment, the frames 1100 and 1200 includes an upper frame 1100 and the lower frame 1200. The upper frame 1100 (or first frame) is disposed being extended along each upper edge of the display device 1 and the accessory device 1300, thereby supporting the upper portion of the display device 1 and the upper portion of the accessory device 1300.

The lower frame 1200 (or second frame) is disposed being extended along each lower edge of the display device 1 and the accessory device 1300, thereby supporting each lower edge of the display device 1 and the accessory device 1300 at a lower side. Thus, the frames 1100 and 1200 allow the display device 1 and the accessory device 1300 to be stably mounted to the wall.

According to design, only the upper frame 1100 may be provided. For example, only the upper frame 1100 may stably support the display device 1 and the accessory device 1300 mounted thereto. Alternatively, a separate structure (e.g., a shelf, a small wardrobe, etc.) other than the lower frame 1200 may support the lower edge of the display device 1 and the accessory device 1300.

The upper frame 1100 and the lower frame 1200 are designed to have the same shape, and are symmetrical with respect to an axis of the X direction. In other words, the upper frame 1100 may be rotated 180 degrees to be used as the lower frame 1200. Because one structure is applied to both the upper frame 1100 and the lower frame 1200, an efficient production is possible.

Below, detailed structures of the frames 1100 and 1200 will be described.

Figure 2:
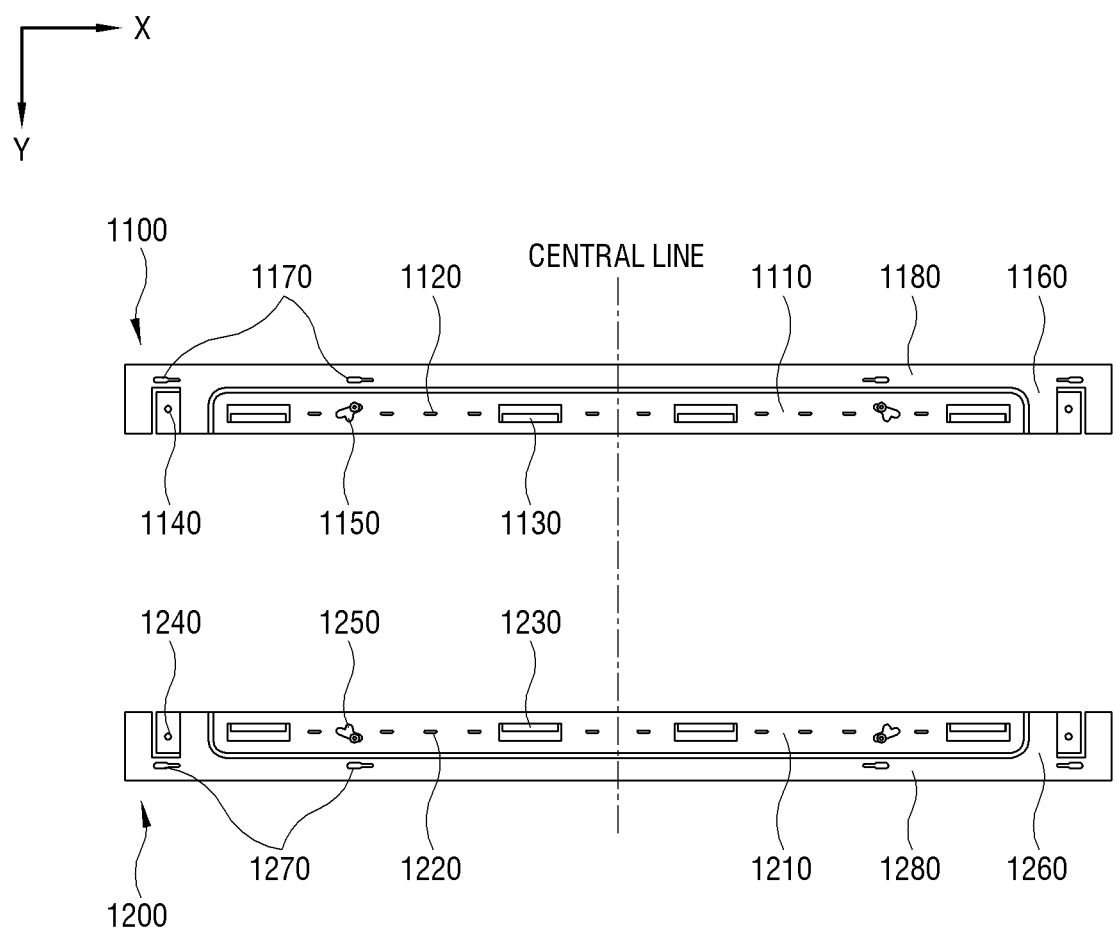
FIG. 2 is a front view of a frame viewed from the front according to an embodiment of the disclosure.

FIG. 2 is a front view of a frame viewed from the front.

Figure 3:
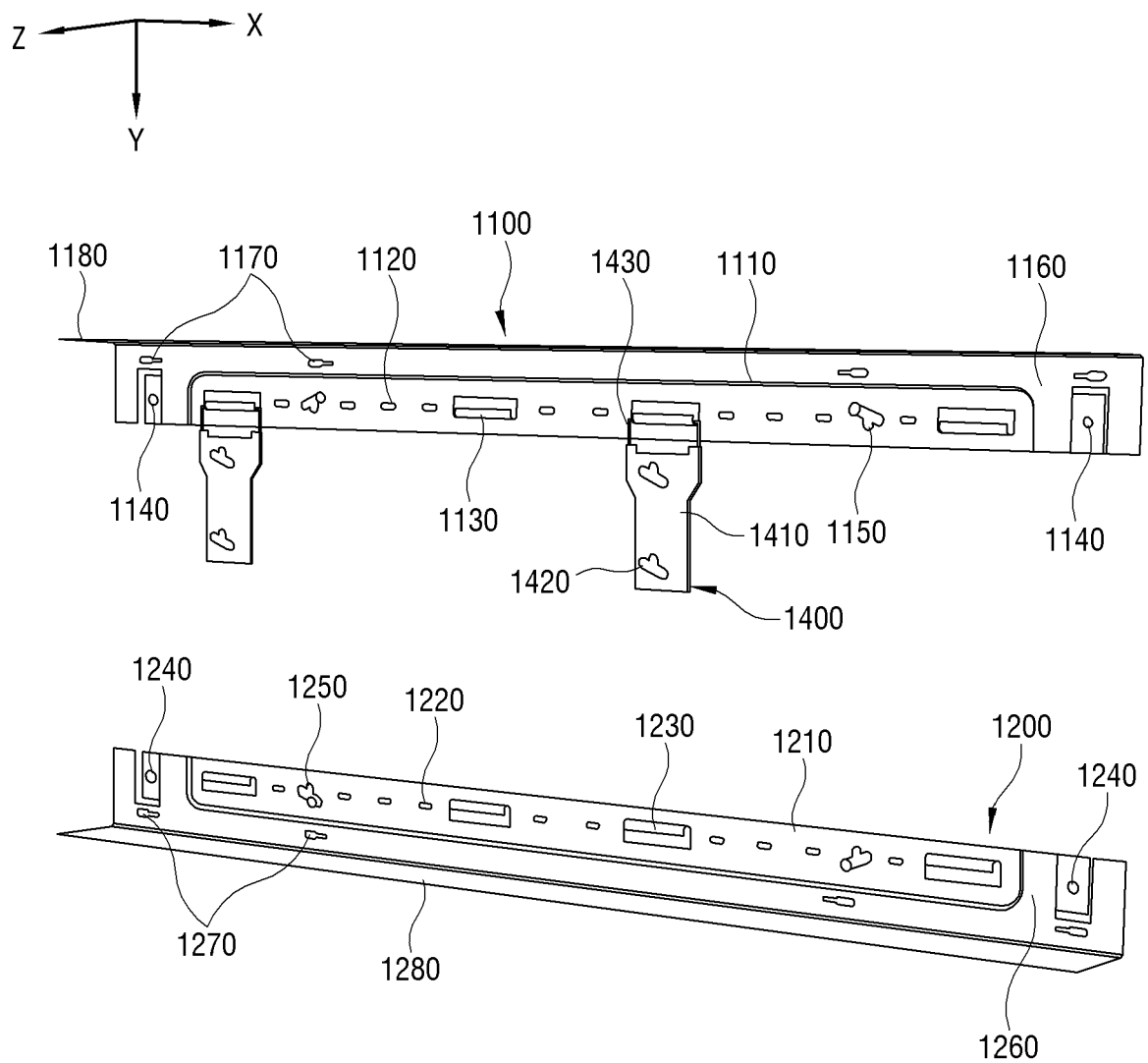
FIG. 3 is a perspective view illustrating that a device bracket is mounted to a frame according to an embodiment of the disclosure.

FIG. 3 is a perspective view illustrating that a device bracket is mounted to a frame.

As shown in FIGS. 1, 2 and 3, the upper frame 1100 and the lower frame 1200 are extended side by side in the X direction. A distance between the upper frame 1100 and the lower frame 1200 may be adjustable corresponding to the vertical length of the display device 1. A means for adjusting and fixing the distance between the upper frame 1100 and the lower frame 1200 will be described later. Further, the lower frame 1200 has the same size and shape as the upper frame 1100, and is the same as the upper frame 1100 rotated 180 degrees. Therefore, in this embodiment, only the upper frame 1100 will be representatively described, and the descriptions about the lower frame 1200 will be omitted.

When an axial line in the Y direction crossing the center of the upper frame 1100 or the lower frame 1200 is referred to as a central line, the upper frame 1100 or the lower frame 1200 has a structure in which the left and right sides thereof are symmetrical with respect to the central line. Such a bilateral symmetrical structure of the upper frame 1100 and the lower frame 1200 is to allow a user to freely install the display device 1 to the left or right side as desired.

The upper frame 1100 may include a frame main body 1110. The frame main body 1110 is extended in parallel with the X direction. There are no limits to the material of the frame main body 1110, but the material of the frame main body 1110 is required to be strong enough to support the weight of the display device 1. Thus, the frame main body 1110 is made of iron or the like metal excellent in strength and hardness. The frame main body 1110 includes an installation surface coupling hole 1120, a first frame supporting portion 1130, a bar coupling portion 1140, and a horizontal adjustment hole 1150, which are spaced apart from each other in the lengthwise direction of the frame main body 1110, in other words, the X direction.

The installation surface coupling hole 1120 is provided in plural on the frame main body 1110, thereby allowing the frame main body 1110 and the wall to be fastened by a screw. The screw is fastened to the wall through the plurality of the installation surface coupling hole 1120 while the rear surface of the frame main body 1110 is in contact with the wall, thereby supporting the frame main body 1110 on the wall.

The first frame supporting portion 1130 is provided to support a device bracket 1400 (to be described later). The first frame supporting portion 1130 is structured and shaped corresponding to the structure and shape of the device bracket 1400. In this embodiment, the first frame supporting portion 1130 protrudes from the frame main body 1110 in the Z direction and is then bent upwards, in other words, has a structure similar to an inverted hook. The device bracket 1400 (to be described later) has an end portion shaped like a hook, so that the device bracket 1400 can be stably mounted to the first frame supporting portion 1130. However, the structure between the first frame supporting portion 1130 and the device bracket 1400 is not limited to the structure described above, and may be designed to have various structures. For example, the first frame supporting portion 1130 may be shaped like the hook, and the end portion of the device bracket 1400 may have the hook structure to be hooked to the first frame supporting portion 1130.

The bar coupling portion 1140 is used in a structure for adjusting the distance between the upper frame 1100 and the lower frame 1200. In this embodiment, the bar coupling portion 1140 is shaped like a hole to which a screw is fastened. In this regard, details will be described later.

The horizontal adjustment hole 1150 includes a hole slantly elongated having a predetermined length. Two horizontal adjustment holes 1150 are positioned left and right symmetrically with respect to the central line, and the size of the horizontal adjustment hole 1150 is larger than the diameter of the screw to be fastened thereto. Therefore, the horizontal position of the upper frame 1100 may be adjusted by fastening the screw to each horizontal adjustment hole 1150.

The upper frame 1100 may include a spacer 1160. The spacer 1160 refers to an area protruding from the frame main body 1110 in the Z direction. In other words, when the display device 1 is mounted to the frame main body 1110, the spacer 1160 is closer to the rear surface of the display device 1 than the frame main body 1110. In this embodiment, the spacer 1160 is disposed in the form of surrounding the frame main body 1110, but there are no limits to a relative position between the frame main body 1110 and the spacer 1160. According to design, various structures are possible between the frame main body 1110 and the spacer 1160. When the frame main body 1110 is in contact with the wall, the spacer 1160 forms a predetermined space between the frame main body 1110 and the display device 1 while facing the rear surface of the display device 1 mounted to the frame main body 1110. This space refers to a space where the device bracket 1400 may be located, and also refers to a space for a cable port installed in the back of the display device 1. The spacer 1160 is formed with a second frame supporting portion 1170 thereon.

The second frame supporting portion 1170 is formed in plural on the spacer 1160, and provided to support the accessory device 1300. In this embodiment, the second frame supporting portion 1170 includes a hole elongated in the X direction. However, the second frame supporting portion 1170 may be designed to have a structure varied depending on the supporting structure of the accessory device 1300, and not limited to a specific embodiment. Further, this embodiment illustrates that the second frame supporting portion 1170 is formed on the spacer 1160, but this is merely an example of design. Alternatively, the second frame supporting portion 1170 may be formed on the frame main body 1110.

The upper frame 1100 may include a frame bending portion 1180. The frame bending portion 1180 is bent from the upper edge of the upper frame 1100 toward the Z direction (in other words, toward the front or the display device 1). In this embodiment, the upper edge of the upper frame 1100 is formed by the spacer 1160, and thus the frame bending portion 1180 is bent from the spacer 1160. However, when the upper edge of the upper frame 1100 is formed by the frame main body 1110, the frame bending portion 1180 is bent from the frame main body 1110. The upper frame 1100 covers the upper edge of the mounted display device 1 or the upper edge of the mounted accessory device 1300.

Further, the lower frame 1200 may also include a frame main body 1210, an installation surface coupling hole 1220, a first frame supporting portion 1230, a bar coupling portion 1240, a horizontal adjustment hole 1250, a spacer 1260, a second frame supporting portion 1270, and a frame bending portion 1280. The lower frame 1200 has the same structure as the upper frame 1100, and therefore the foregoing descriptions about the structure of the upper frame 1100 may be equally applied to even the lower frame 1200. When the display device 1 is mounted, the lower edge of the display device 1 is put on the surface of a frame bending portion 1280 of the lower frame 1200 in the −Y direction.

Below, the structure of the device bracket 1400 will be described.

The device bracket 1400 is mounted to the first frame supporting portion 1130 as being coupled to the back of the display device 1, thereby mounting the display device 1 to the upper frame 1100. There are no limits to the material of the device bracket 1400, but the material of the device bracket 1400 is made of iron or the like metal excellent in strength and hardness so as to support the display device 1. One device bracket 1400 may be used to support the display device 1. Alternatively, two or more device brackets 1400 may be used to support the display device 1.

The device bracket 1400 includes a bracket main body 1410. The bracket main body 1410 includes a device coupling portion 1420 for coupling with the back of the display device 1. The device coupling portion 1420 may have various structure according to how it is coupled to the back of the display device 1. For example, the rear surface of the display device 1 may be formed with holes according to video electronic standards association (VESA) standards. The device coupling portion 1420 may include the holes according to the VESA standards, and thus fastened to the display device 1 by screws.

The device bracket 1400 includes the bracket mounting portion 1430. The bracket mounting portion 1430 is provided in an end portion of the bracket main body 1410 so as to be mounted to the first frame supporting portion 1130. The bracket mounting portion 1430 is shaped corresponding to the first frame supporting portion 1130. In this embodiment, the bracket mounting portion 1430 is shaped like a hook by way of example. However, the shape of the bracket mounting portion 1430 is not limited to this embodiment. The bracket mounting portion 1430 is rotatably connected to the bracket main body 1410, thereby facilitating the mounting of the display device 1.

Below, it will be described that a structure for allowing a cable to pass is provided in the back of the display device 1 when the display device 1 is mounted to the frames 1100 and 1200.

Figure 4:
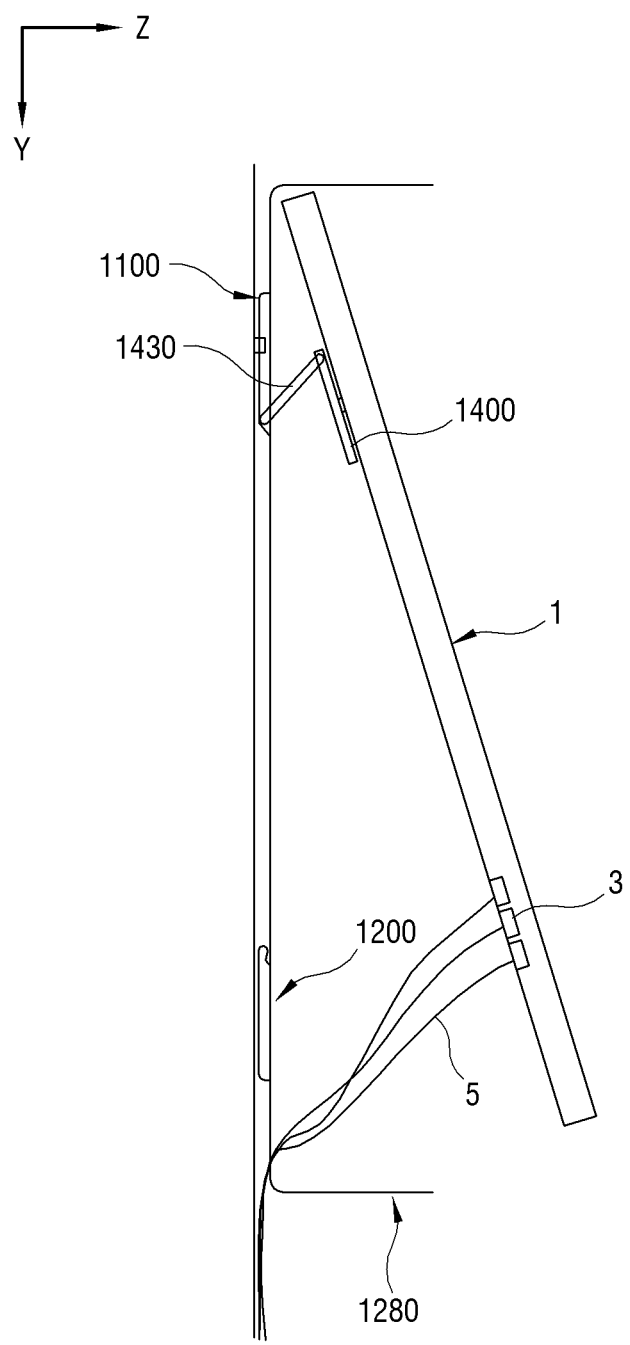
FIG. 4 is a lateral view illustrating that a display device mounted to a frame is tilted according to an embodiment of the disclosure.

FIG. 4 is a lateral view illustrating that a display device mounted to a frame is tilted.

Figure 5:
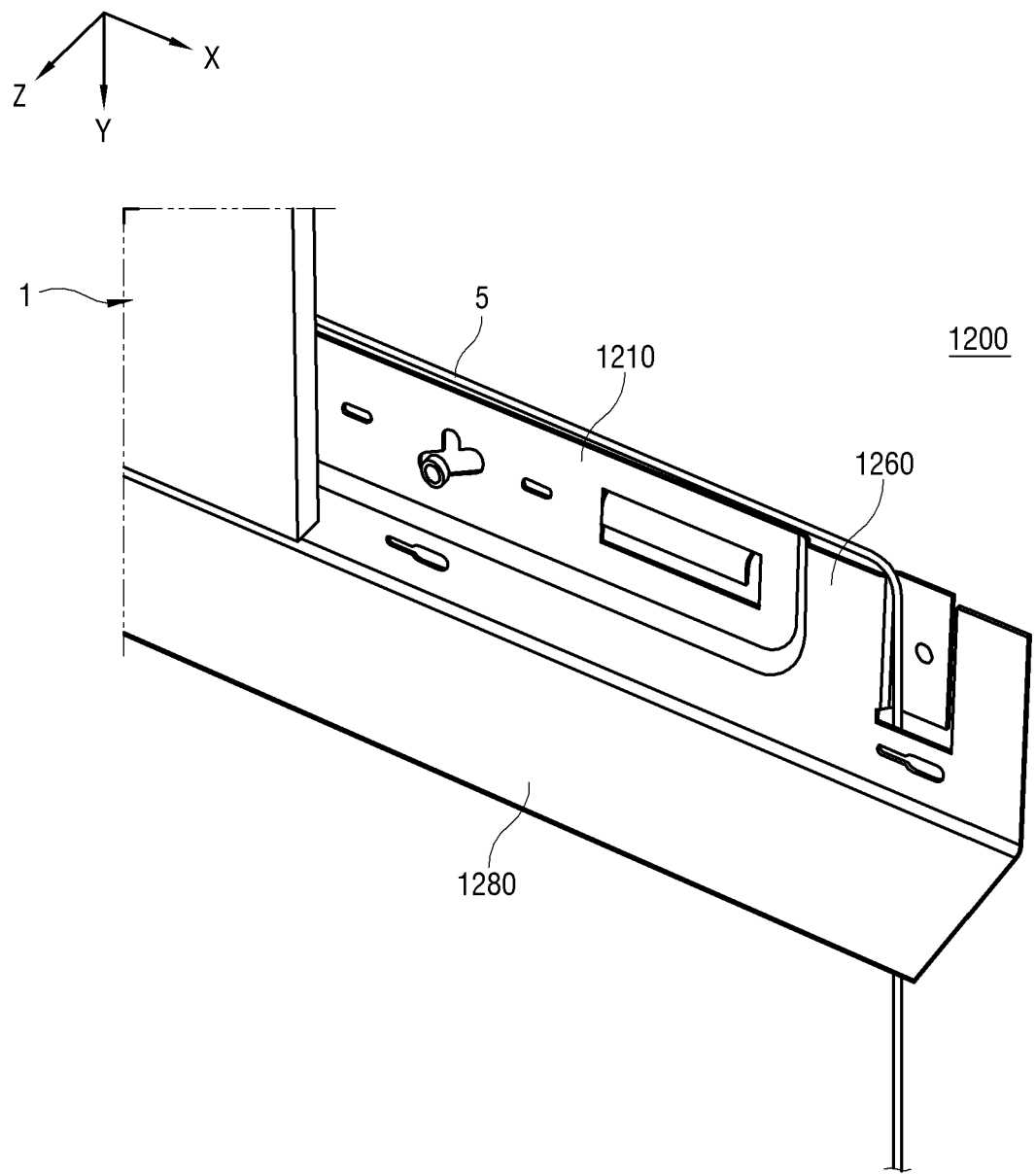
FIG. 5 is a partial perspective view showing a structure of a lower frame, in which a cable passes according to an embodiment of the disclosure.

FIG. 5 is a partial perspective view showing a structure of a lower frame, in which a cable passes.

As shown in FIGS. 4 and 5, the device bracket 1400 is mounted to the rear surface of the display device 1, and the bracket mounting portion 1430 is mounted to the upper frame 1100. The structure that the bracket mounting portion 1430 is mounted to the upper frame 1100 is the same as described the foregoing embodiment. The bracket mounting portion 1430 is rotatable in the device bracket 1400. Therefore, when a user grabs and pulls the lower edge of the display device 1 in the Z direction, a space is secured in a lower side of the display device 1 so that a cable 5 can be connected to a port 3 provided in the lower side of the display device 1.

The cable 5 includes a power cable and a signal cable. In the lower frame 1200, a spacer 1260 forms a space between the main body frame 1210 and the display device 1, so that the cable 5 can pass the back of the display device 1 through this space. For example, the cable 5 is extended to the back of the display device 1 along the spacer 1160, and connected to a port 3 of the display device 1. When the extension and connection of the cable 5 are completed, a user pushes the lower edge of the display device 1 in the −Z direction, thereby returning the display device 1 to the normal mounting state.

Figure 6:
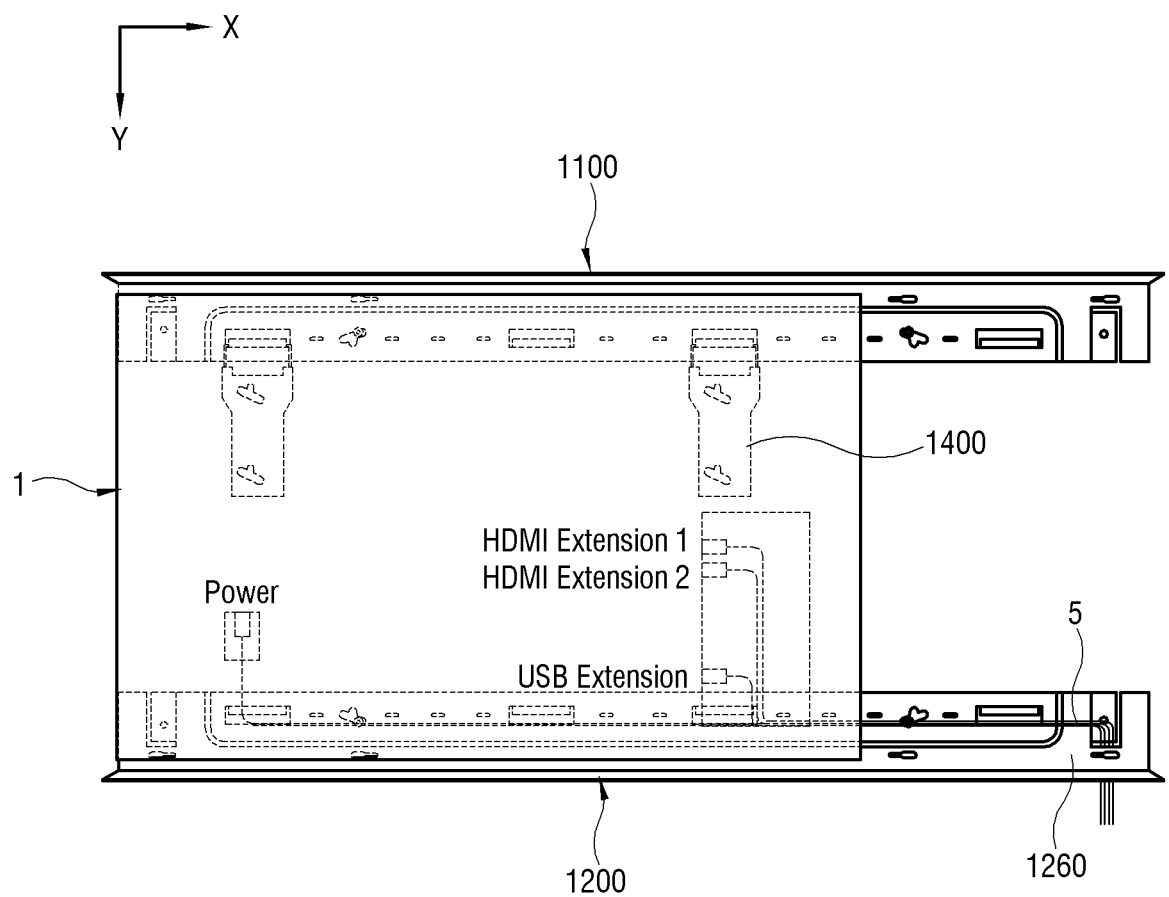
FIG. 6 is a front view illustrating that a display device is mounted to a left area of a frame according to an embodiment of the disclosure.

FIG. 6 is a front view illustrating that a display device is mounted to a left area of a frame.

Figure 7:
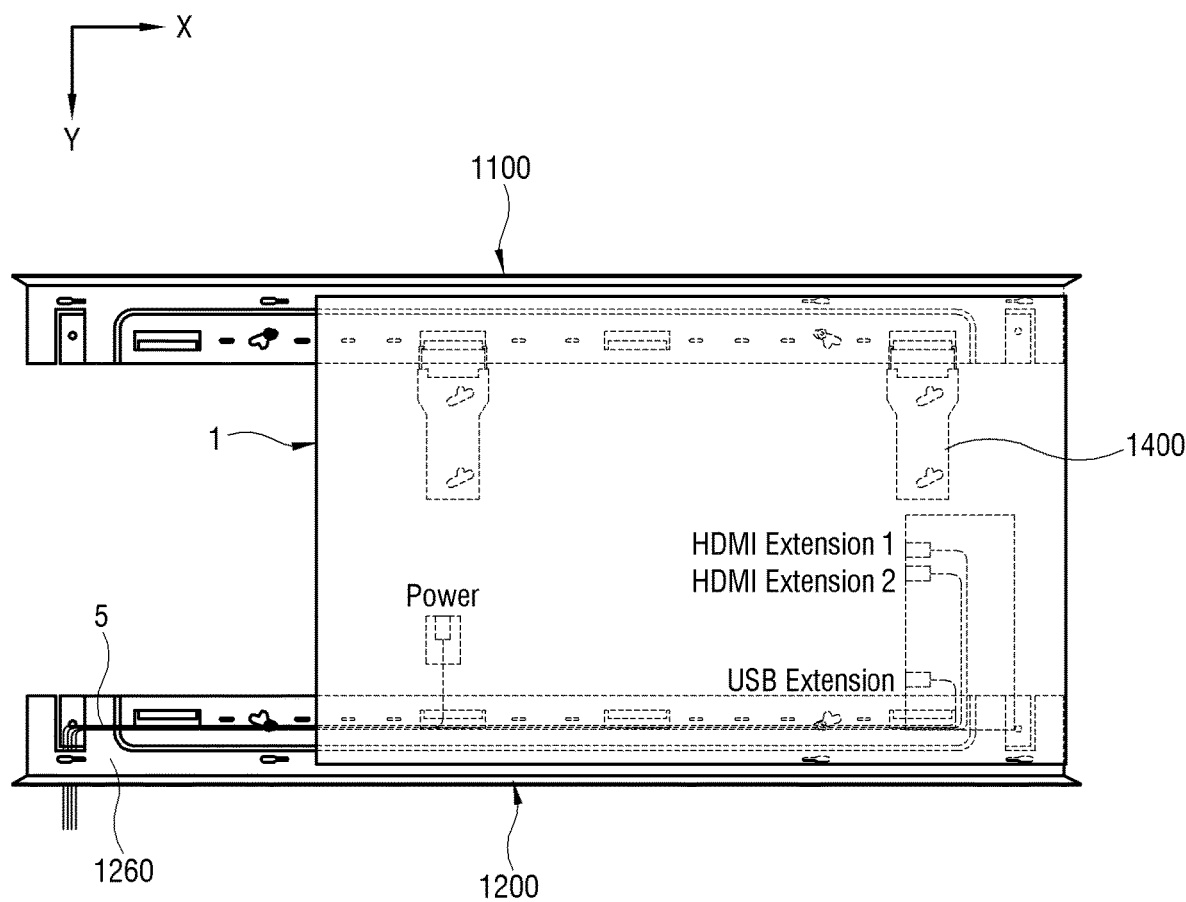
FIG. 7 is a front view illustrating that a display device is mounted to a right area of a frame according to an embodiment of the disclosure.

FIG. 7 is a front view illustrating that a display device is mounted to a right area of a frame.

Figure 8:
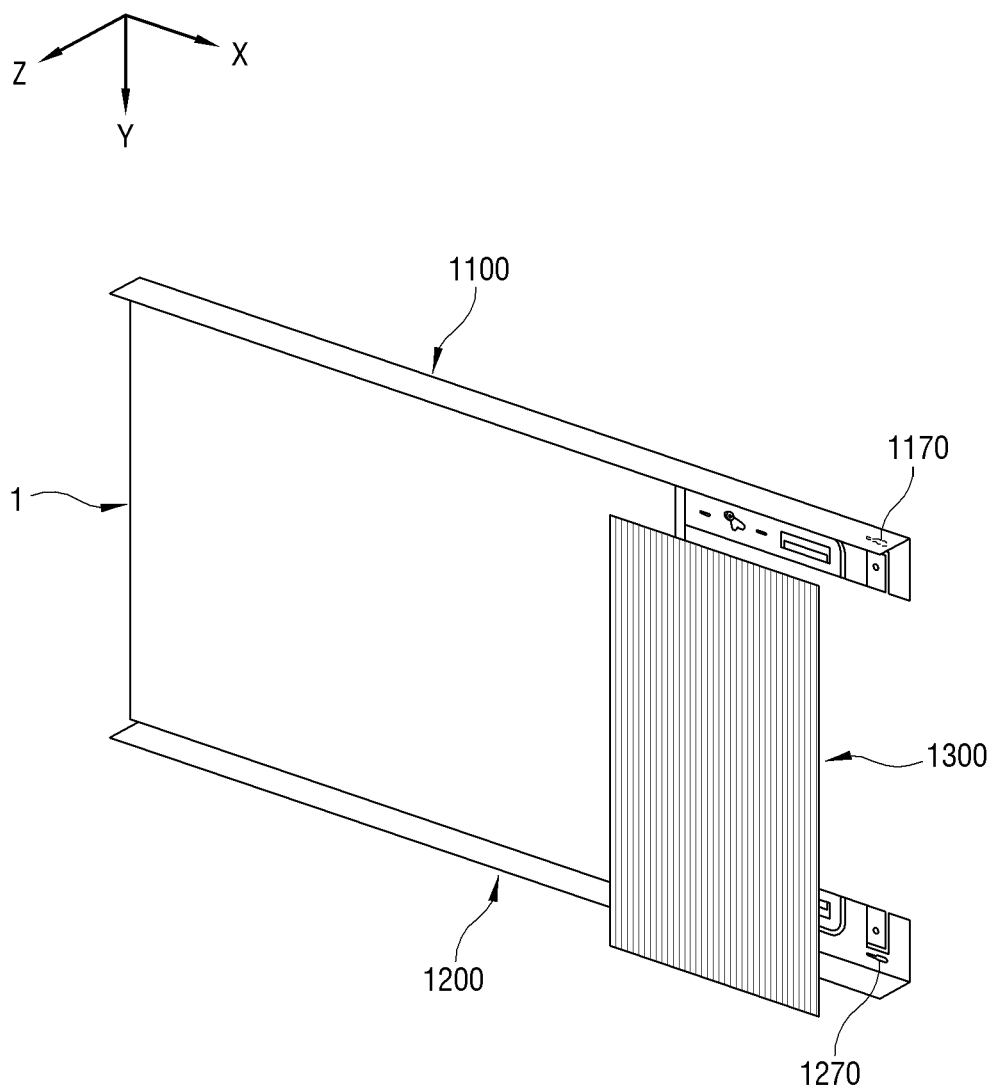
FIG. 8 is a perspective view illustrating that an accessory device is additionally mounted to a frame to which a display device is mounted according to an embodiment of the disclosure.

FIG. 8 is a perspective view illustrating that an accessory device is additionally mounted to a frame to which a display device is mounted.

As shown in FIGS. 6, 7 and 8, the device bracket 1400 coupled to the back of the display device 1 is mounted to the upper frame 1100. Further, the cable 5 passes the back of the display device 1 and connects with the display device 1 through the space formed by the spacer 1260 of the lower frame 1200. Here, the upper frame 1100 and the lower frame 1200 are structured to have bilateral symmetry, and therefore the display device 1 may be disposed at the left side (see FIG. 6) or the right side (see FIG. 7) of the frames 1100 and 1200.

Here, the horizontal length of the display device is shorter than the total length of the frames 1100 and 1200, and therefore an empty area (for example, the right area of the display device 1 in FIG. 6 and the left area of the display device 1 in FIG. 7) where the display device 1 is not mounted is created in the frames 1100 and 1200. The accessory device 1300 may be mounted to this empty area.

The upper frame 1100 and the lower frame 1200 respectively include the second frame supporting portions 1170 and 1270 provided to support the accessory device 1300. According to design, the second frame supporting portions 1170 and 1270 may be provided in only one of the upper frame 1100 or the lower frame 1200. The second frame supporting portions 1170 and 1270 may have any structure as long as they support the back of the accessory device 1300.

The accessory device 1300 is mounted to the frames 1100 and 1200 adjacent to the display device 1 side by side. Various types of accessory devices 1300 may be provided according to purposes. For example, the accessory device 1300 may be provided as an accessory plate having an image printed on the front surface thereof, a shelf provided to place small tools on a plate thereof, or an electronic device for assisting the function of the display device 1.

When the accessory device 1300 is provided as the electronic device, a power supply may be needed to operate the accessory device 1300. The accessory device 1300 may include a built-in power supply like a general electronic device. Alternatively, according to design, the power supply for supplying power to the accessory device 1300 may be provided in the upper frame 1100 or the lower frame 1200. For example, the accessory device 1300 may include a power input terminal on the back thereof to receive power, and the power supply including a power output terminal for outputting power may be provided in the upper frame 1100 or the lower frame 1200. When the accessory device 1300 is mounted to the frames 1100 and 1200, the power input terminal of the accessory device 1300 comes into contact with the power output terminal, so that the power supply provided in the upper frame 1100 or the lower frame 1200 can supply power to the accessory device 1300.

Below, the structure of the accessory device 1300 will be described by way of example.

Figure 9:
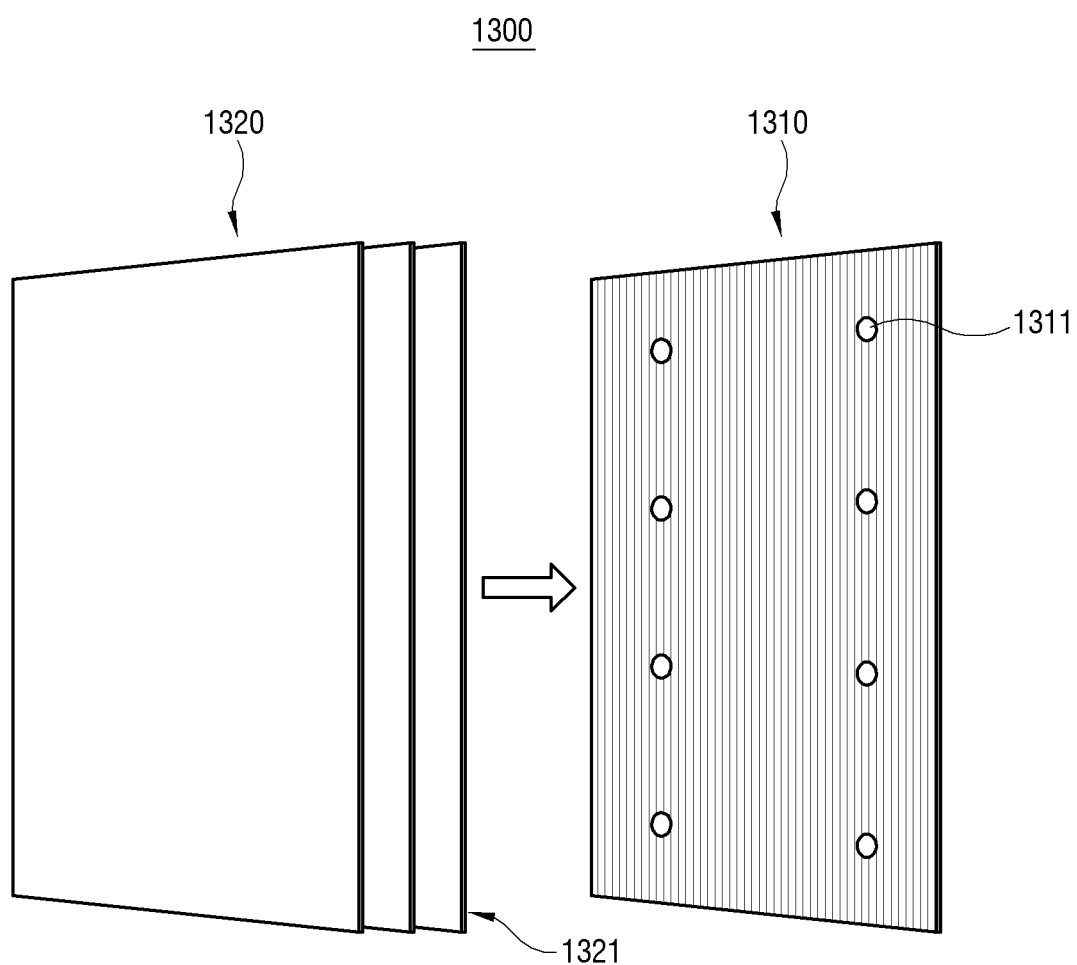
FIG. 9 illustrates an example of an accessory device according to an embodiment of the disclosure.

FIG. 9 illustrates an example of an accessory device.

As shown in FIGS. 8 and 9, when the accessory device 1300 is implemented by the accessory plate, the accessory device 1300 has a dual structure of a back plate 1310 and a front plate 1320. The back plate 1310 is mounted to the frames 1100 and 1200, and the front plate 1320 is detachable from the back plate 1310. With this dual structure, a user may replace only the front plate 1320 while leaving the back plate 1310 mounted to the frames 1100 and 1200. A plurality of front plates 1320 on which various images are printed may be provided, and thus the front plate 1320 mounted to the back plate 1310 is replaced according to a user's tastes. The accessory device 1300 with such a structure is easier to be replaced and less cost than that configured as a single body.

The back plate 1310 may be made of various materials such as metal, plastic, and wood. The back plate 1310 may include a first plate coupling portion or a first plate mounting portion 1311 on the front thereof, i.e., the surface facing toward the front plate 1320, so that the front plate 1320 can be mounted to the first plate mounting portion 1311. In this embodiment, the first plate mounting portion 1311 includes a magnet to which the front plate 1320 made of metal can be attached. The first plate mounting portion 1311 may have any structure as long as the front plate 1320 can be detachably mounted to the back plate 1310. For example, when the front plate 1320 is formed with a hook on the back thereof, the first plate mounting portion 1311 may include a hook holder to which the hook is hooked.

The front plate 1320 includes a second plate coupling portion or second plate mounting portion 1321 on the rear surface thereof to be mounted to the first plate mounting portion 1311 of the back plate 1310, and includes an image of various designs, a shelf, etc. on the front surface thereof.

The front plate 1320 may be made of various materials such as metal, plastic, and wood. When the first plate mounting portion 1311 includes the magnet, the second plate mounting portion 1321 may be made of metal to be attached to the first plate mounting portion 1311.

Figure 10:
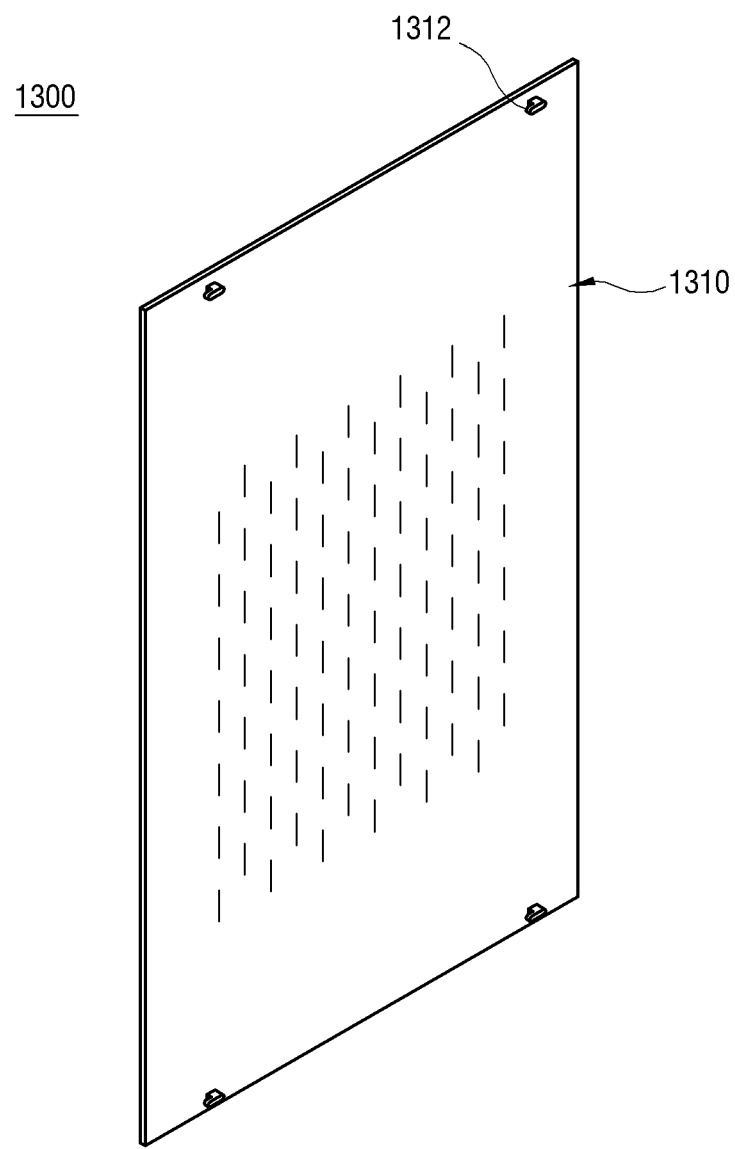
FIG. 10 is a perspective view showing the rear of a back plate of an accessory device according to an embodiment of the disclosure.

FIG. 10 is a perspective view showing the rear of a back plate of an accessory device.

Figure 11:
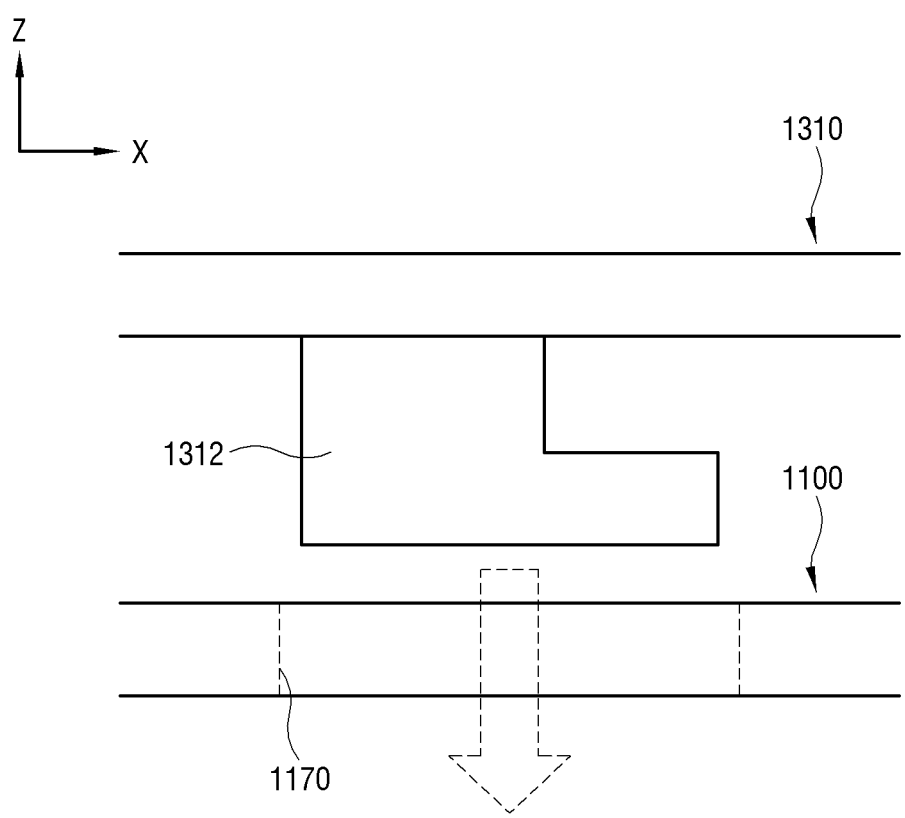
FIG. 11 is a plan view showing a plate mounting portion of a back plate viewed from above according to an embodiment of the disclosure.

FIG. 11 is a plan view showing a plate mounting portion of a back plate viewed from above.

Figure 12:
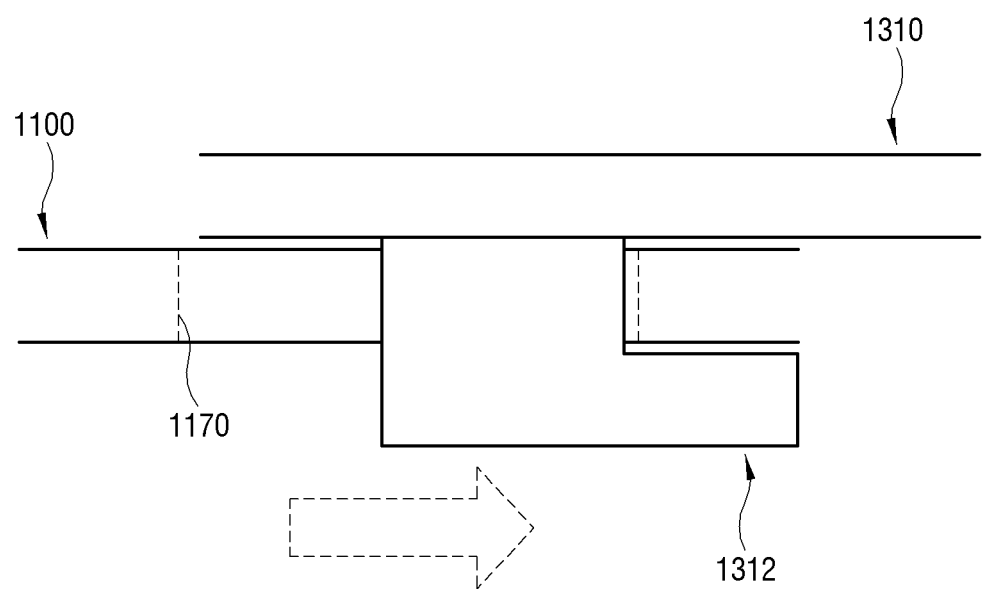
FIG. 12 is a plan view illustrating that a plate mounting portion of a back plate is mounted to a frame according to an embodiment of the disclosure.

FIG. 12 is a plan view illustrating that a plate mounting portion of a back plate is mounted to a frame.

As shown in FIGS. 10, 11 and 12, one or more plate mounting portions 1312 are provided on the rear surface of the back plate 1310 of the accessory device 1300. The plate mounting portion 1312 is provided to be supported by the second frame supporting portion 1170 of the upper frame 1100(or the lower frame). There are no limits to the supporting structure between the plate mounting portion 1312 and the second frame supporting portion 1170. In this embodiment, the second frame supporting portion 1170 includes a hole, and the plate mounting portion 1312 includes a protrusion to be slidably mounted as being accommodated in the second frame supporting portion 1170.

The plate mounting portion 1312 protrudes in the -Z direction, and has an end portion bent in the X direction. When the plate mounting portion 1312 is accommodated in the second frame supporting portion 1170 and then slides in the X direction, the edge of the second frame supporting portion 1170 is caught in the space between the end portion of the plate mounting portion 1312 and the rear surface of the back plate 1310. In this way, the accessory device 1300 is mounted to the upper frame 1100. To separate the back plate 1310, the foregoing process may be reversed.

Below, it will be described that the distance between the upper frame and the lower frame is adjusted and fixed corresponding to the vertical length of the display device.

Figure 13:
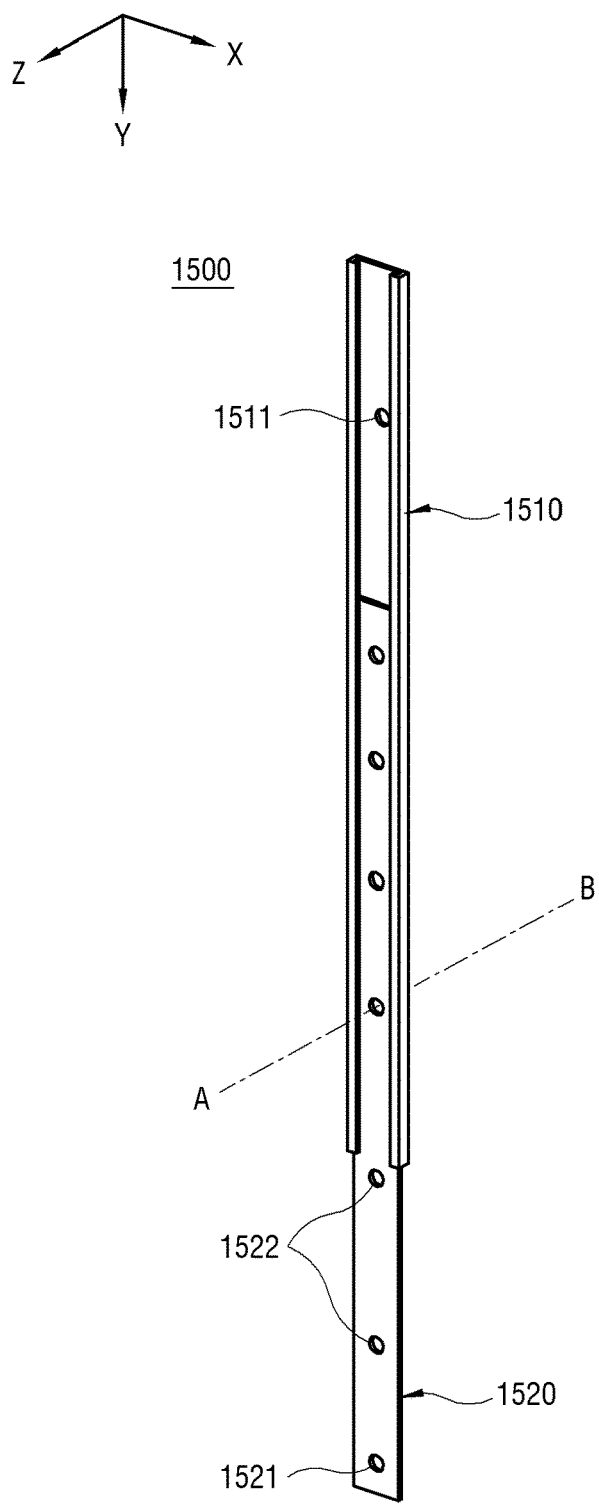
FIG. 13 is a perspective view of a length adjustable bar according to an embodiment of the disclosure.

FIG. 13 is a perspective view of a length adjustable bar.

Figure 14:
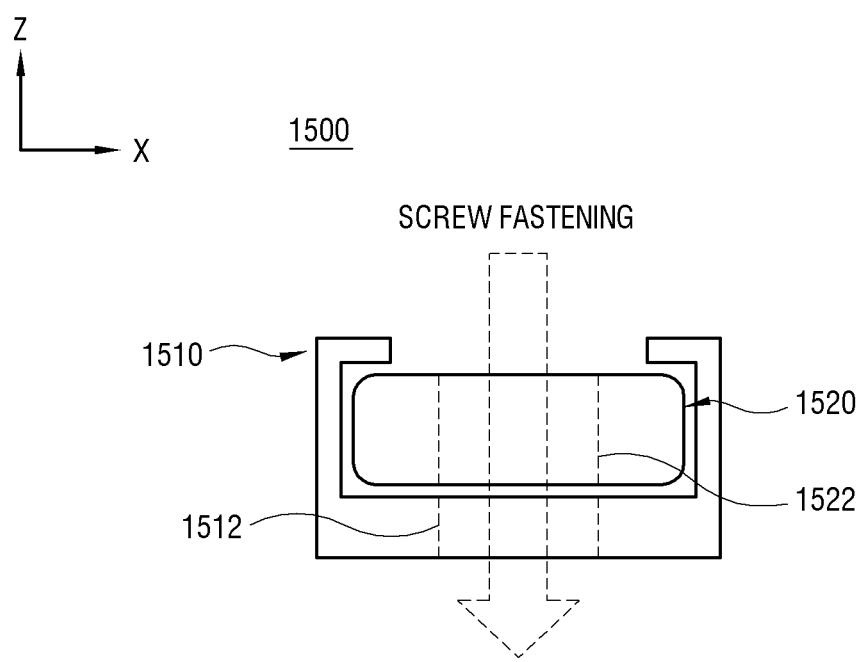
FIG. 14 is a cross-sectional view taken along line A-B of FIG. 13 according to an embodiment of the disclosure.

FIG. 14 is a cross-sectional view taken along line A-B of FIG. 13.

As shown in FIGS. 2, 13 and 14, a length adjustable bar 1500 includes a first bar 1510, and a second bar 1520 accommodated in the first bar 1510 and slidably provided along a lengthwise direction of the first bar 1510. The first bar 1510 and the second bar 1520 are extended in the Y direction. The first bar 1510 has an accommodating space therein extended in the Y direction, and an end portion of the second bar 1520 is accommodated in this accommodating space and slides in the Y direction. The first bar 1510 accommodates the second bar 1520 while surrounding the second bar 1520, thereby preventing the second bar 1520 from being separated. Therefore, the total length of the length adjustable bar 1500 is variable.

The first bar 1510 includes a first bar end coupling portion 1511 formed in a certain region of a −Y directional end and coupled to the bar coupling portion 1140 of the upper frame 1100. The first bar end coupling portion 1511 and the bar coupling portion 1140 are respectively formed with holes, and fastened together by a screw.

The first bar 1510 includes a length holding portion 1512 formed in a certain region spaced apart from the first bar end coupling portion 1511 in the Y direction. The length holding portion 1512 holds the second bar 1520 at a predetermined position not to slide any more relative to the first bar 1510, thereby holding the total length of the length adjustable bar 1500. In this embodiment, the length holding portion 1512 includes a hole to be fastened to one among a plurality of vertical length adjusters 1522 (to be described later).

The second bar 1520 includes a second bar end coupling portion 1521 formed in a certain region of a Y directional end and coupled to a bar coupling portion 1240 of the lower frame 1200. The second bar end coupling portion 1521 and the bar coupling portion 1240 are respectively formed with holes, and fastened together by a screw.

The second bar 1520 includes a plurality of vertical length adjusters 1522 sequentially spaced apart from the second bar end coupling portion 1521 in the −Y direction. The plurality of vertical length adjusters 1522 are provided corresponding to the predefined vertical lengths of the display device, respectively. For example, the vertical length adjuster 1522 includes a plurality of holes respectively corresponding to the vertical lengths of 32-inch, 43-inch, 50-inch, 55-inch, and 65-inch display devices. When the position of the length holding portion 1512 is aligned with the vertical length adjuster 1522 corresponding to the 50-inch display device and fastened together by the screw, the total length of the length adjustable bar 1500 corresponds to the vertical length of the 50-inch display device. When the screw is released, the total length of the length adjustable bar 1500 becomes variable again.

Figure 15:
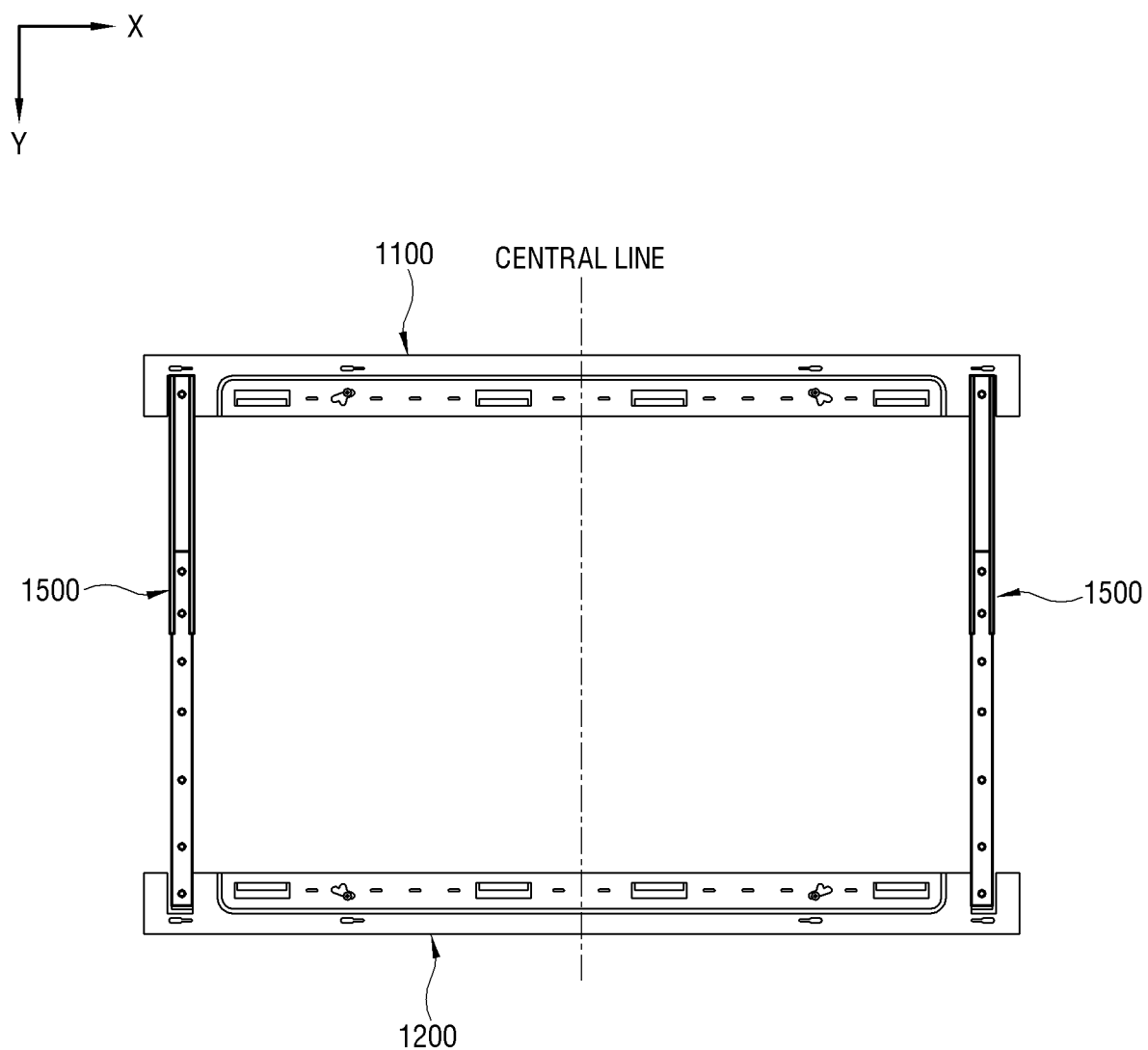
FIG. 15 illustrates an example that two length adjustable bars are coupled to a frame according to an embodiment of the disclosure.

FIG. 15 illustrates an example that two length adjustable bars are coupled to a frame.

As shown in FIG. 15, the upper frame 1100 and the lower frame 1200 are extended long in the X direction, and has bilateral symmetry with respect to the central line. Like the foregoing embodiment, there are provided two length adjustable bars 1500 adjusted to have the same length, in which one length adjustable bar 1500 is used to fix the distance between the upper frame 1100 and the lower frame 1200 at a left edge side, and the other length adjustable bar 1500 is used to fix the distance between the upper frame 1100 and the lower frame 1200 at a right edge side. In this way, the length adjustable bar 1500 adjusts and stably fix the distance between the upper frame 1100 and the lower frame 1200 as required.

The method of stably fixing the distance between the upper frame 1100 and the lower frame 1200 is not limited to only the method of using the length adjustable bar 1500. Below, another method of fixing the distance between the upper frame 1100 and the lower frame 1200 will be described.

Figure 16:
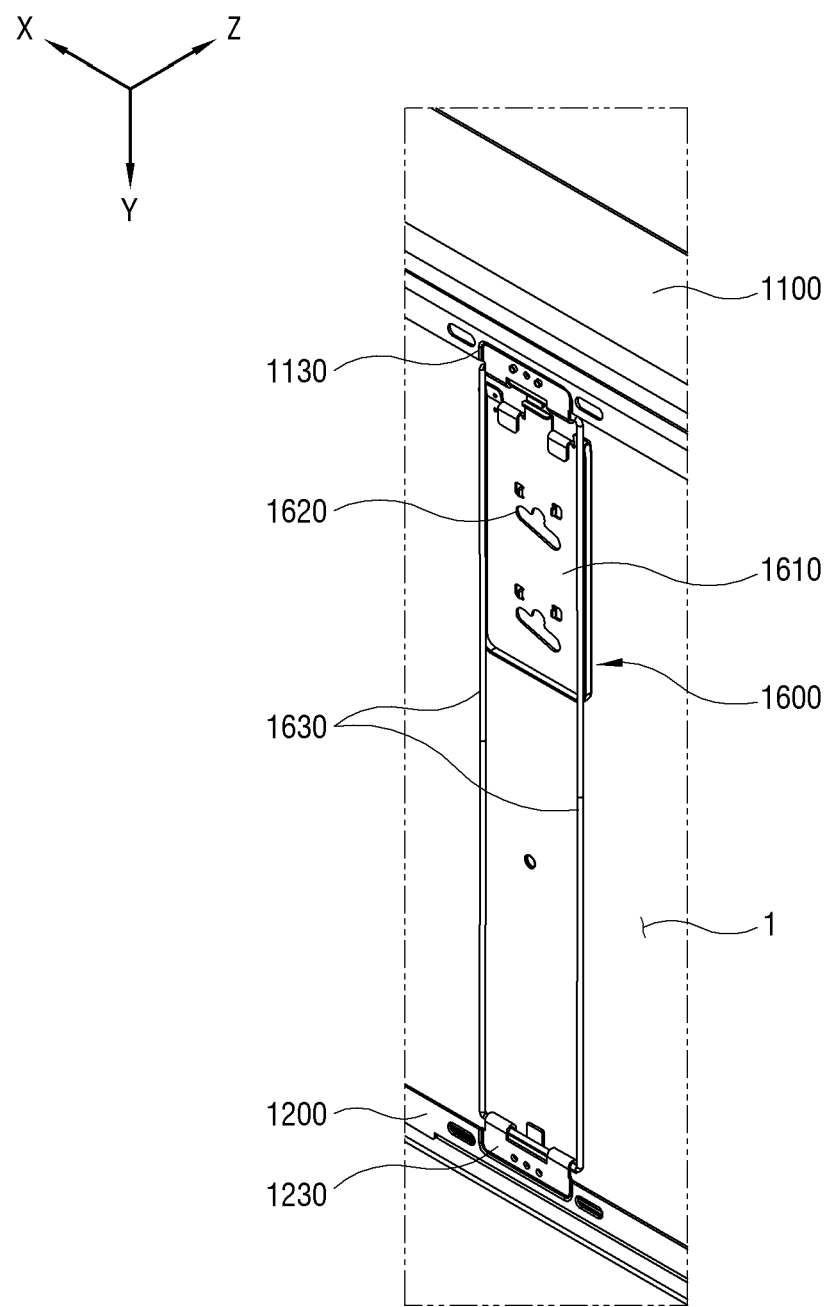
FIGS. 16 and 17 are perspective views of a device bracket provided to fix a space between an upper frame and a lower frame according to an embodiment of the disclosure.
Figure 17:
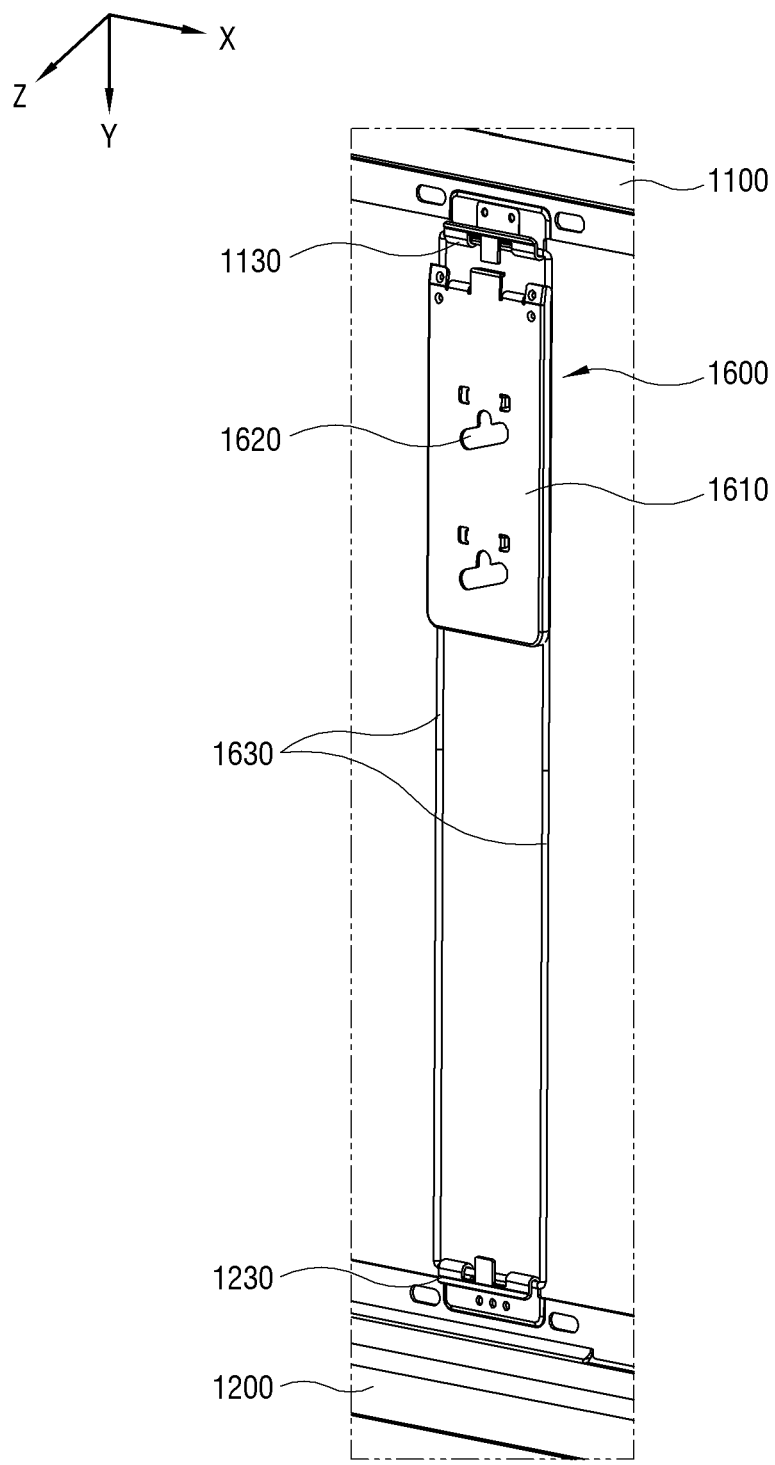

FIGS. 16 and 17 are perspective views of a device bracket provided to fix a space between an upper frame and a lower frame.

As shown in FIGS. 16 and 17, a device bracket 1600 includes a bracket main body 1610 formed with a device coupling portion 1620. The device bracket 1600 according to this embodiment is different from the device bracket 1400 (see FIG. 3) according to the foregoing embodiment, and configured to replace from the device bracket 1400 (see FIG. 3) and the length adjustable bar 1500. The device bracket 1600 is coupled to the display device 1 through the device coupling portion 1620. According to this embodiment, a bracket mounting portion 1630 includes a rectangular ring coupled to the bracket main body 1610 and extended from the first frame supporting portion 1130 of the upper frame 1100 to a first frame supporting portion 1230 of the lower frame 1200 in the Y direction. The first frame supporting portion 1130 of the upper frame 1100 has an upward hook, and the first frame supporting portion 1230 of the lower frame 1200 has a downward hook.

The −Y directional end of the bracket mounting portion 1630 is coupled to the upward hook of the first frame supporting portion 1130 of the upper frame 1100, and the Y directional end of the bracket mounting portion 1630 is coupled to the downward hook of the first frame supporting portion 1230 of the lower frame 1200. Here, the length of the bracket mounting portion 1630 in the Y direction corresponds to the vertical length of the display device 1.

In other words, there may be a plurality of device brackets 1600 having the bracket mounting portions 1630 extended corresponding to the vertical lengths of the plurality of display devices 1. By applying the device bracket 1600 corresponding to the vertical length of the display device 1 to be mounted to the frames 1100 and 1200, the distance between the upper frame 1100 and the lower frame 1200 is stably maintained.

Meanwhile, when the display device 1 and the accessory device 1300 are mounted to the frames 1100 and 1200 like the foregoing embodiments, the display device 1 may be provided to perform an operation corresponding to the accessory device 1300 mounted together. Below, such an embodiment will be described.

Figure 18:
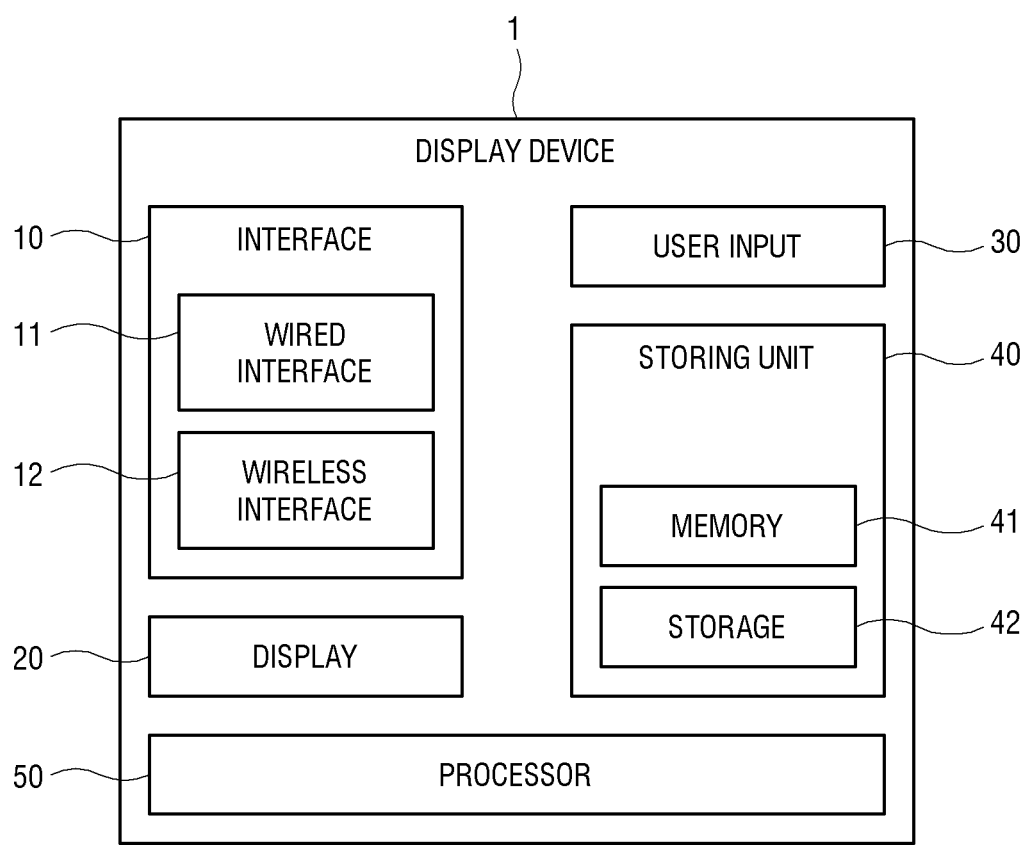
FIG. 18 is a block diagram of a display device according to an embodiment of the disclosure.

FIG. 18 is a block diagram of a display device.

As shown in FIG. 18, the display device 1 according to this embodiment includes a TV, a monitor, a digital signage, an electronic blackboard, an electronic frame, and the like stationary display device. In this embodiment, the display device 1 will be described as an integrated device that accommodates all components in one housing.

However, as described above with reference to FIG. 1, the display device 1 may be divided into the image processing device 100 (see FIG. 1) and the display 200 (see FIG. 1). For example, among hardware components to be described below, a display 20 may be included in the display 200 (see FIG. 1), and the other components may be included in the image processing device 100 (see FIG. 1). In this case, the display 20 is connected to an interface 10.

The display device 1 may include the interface 10. The interface 10 includes an interface circuit through which the display device 1 performs communication with various types of external apparatuses and transmits and receives data. The interface 10 may include at least one of one or more wired interfaces 11 for wired communication, or one or more wireless interface 12 for wireless communication according to connection types.

The wired interface 11 may include a connector or port to which a cable of previously defined transmission standards is connected. For example, the wired interface 11 includes a port connecting with a terrestrial or satellite antenna to receive a broadcast signal or connecting with a cable for cable broadcasting. Further, the wired interface 11 include ports to which cables of various wired transmission standards such as high-definition multimedia interface (HDMI), DisplayPort (DP), digital video interactive (DVI), component, composite, S-video, thunderbolt, and the like to connect with various image processing apparatuses. Further, the wired interface 11 includes a port of universal serial bus (USB) standards to connect with a USB device. Further, the wired interface 11 includes an optical port to which an optical cable is connected. Further, the wired interface 11 includes an audio input port to which an external microphone is connected, and an audio output port to which a headset, an earphone, a loudspeaker etc. is connected. Further, the wired interface 11 includes an Ethernet port connected to a gateway, a router, a hub, etc. for connection with a wide area network (WAN).

The wireless interface 12 includes an interactive communication circuit including at least one of elements such as a communication module, a communication chip, etc. corresponding to various kinds of wireless communication protocols. For example, the wireless interface 12 includes a Wi-Fi communication chip for wireless communication with the access point (AP) based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The display device 1 may include the display 20. The display 20 forms a screen for displaying an image based on an image signal processed by the processor 270. The display 20 includes a display panel, and the display panel may be designed to have various structures. For example, the display 20 may include a display panel having a light-receiving structure like liquid crystal, and a backlight unit illuminating the display panel. Alternatively, the display 20 may include a display panel having a self-emissive structure like an organic light emitting diode (OLED). Alternatively, the display 20 may have a structure where a plurality of micro light emitting diode (LED) modules are combined in the form of tiles to form a large screen.

The display device 1 may include a user input 30. The user input 30 includes a circuit related to various kinds of user input interfaces to be controlled by a user to thereby receive a user input. The user input 30 may be variously configured according to the kinds of display device 1, and may for example include a mechanical or electronic button of the display device 1; various kinds of sensors; a touch pad; a touch screen installed in the display 20; an external input device, such as a keyboard, a mouse and a remote controller, separated from the display device 1 and connected through the interface 10; etc.

The display device 1 may include a storing unit 40. The storing unit 40 is configured to store digitalized data. The storing unit 40 includes one or more volatile memories 41 in which data to be processed by a processor 50 is loaded and data is retained only when power is supplied, and one or more involatile storages 42 in which data is retained regardless of whether power is supplied or not. The memory 41 includes a buffer, a RAM, etc., and the storage 42 includes a flash memory, a hard disc driver (HDD), a solid-state drive (SSD), a read only memory (ROM), etc.

The display device 1 may include the processor 50. The processor 50 includes one or more hardware processors achieved by a central processing unit (CPU), a chipset, a buffer, a circuit, etc. which are mounted on a printed circuit board (PCB). Alternatively, the processor 150 may be designed as a system on chip (SoC). When the display device 1 is a display apparatus, the processor 50 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC.

In this embodiment, the processor 50 may obtain the identification information of the accessory device 1300, and perform an operation corresponding to the obtained identification information. For example, the processor 50 may automatically control the display 20 to display an image corresponding to the identification information of the accessory device 1300, e.g., the accessory plate. Alternatively, the processor 50 may automatically execute an application corresponding to the identification information of the accessory device 1300, e.g., the electronic apparatus. Below, such an embodiment will be described in detail.

Figure 19:
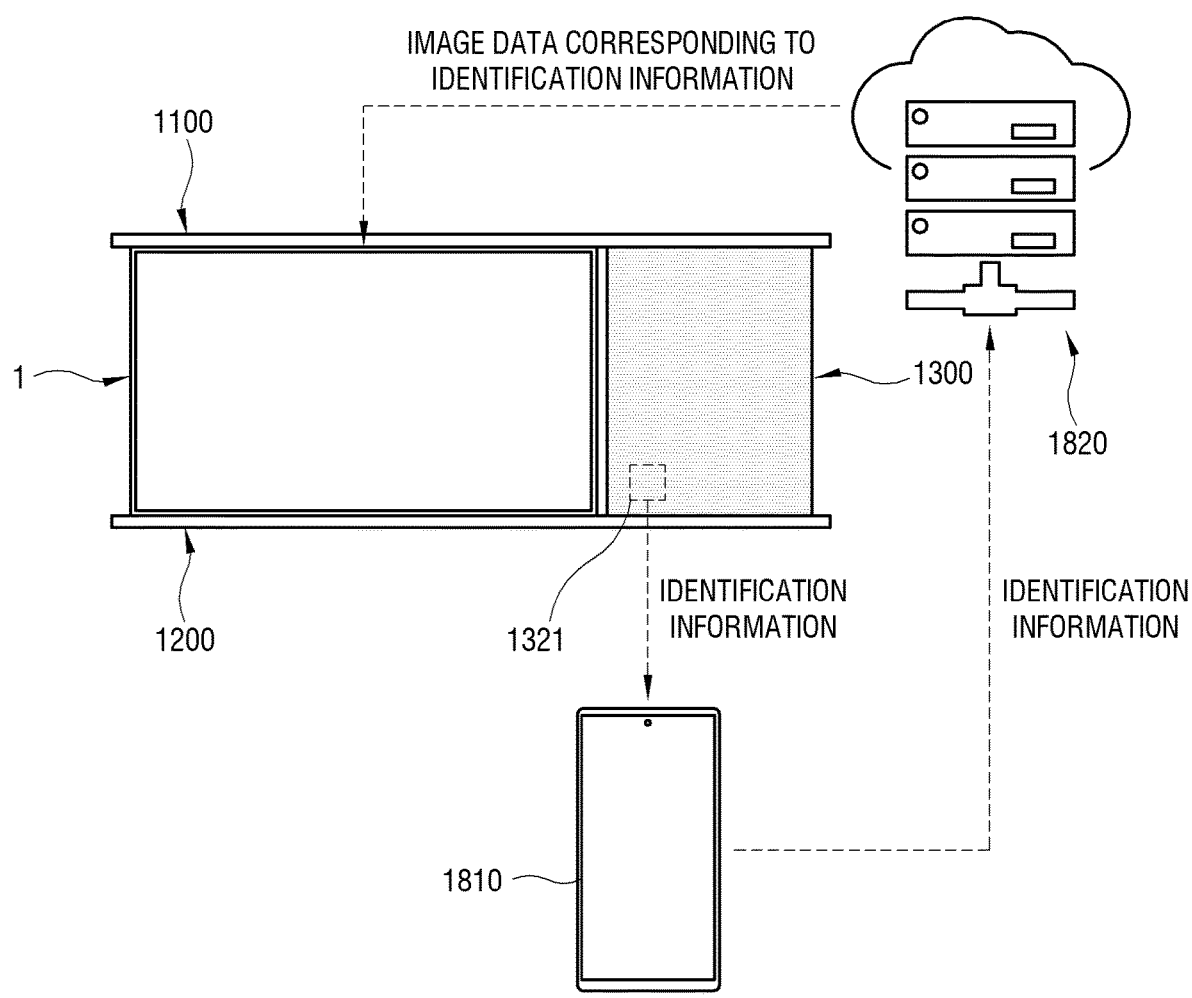
FIG. 19 illustrates an example of a method by which a display device obtains image data corresponding an accessory device according to an embodiment of the disclosure.

FIG. 19 illustrates an example of a method by which a display device obtains image data corresponding to an accessory device.

As shown in FIG. 19, the display device 1 and the accessory device 1300 are mounted to the frames 1100 and 1200. The mounting structure of the display device 1 and the accessory device 1300 is the same as described in the above embodiment. The accessory device 1300 according to this embodiment is the accessory plate including a predetermined image printed on the front surface thereof. When the display device 1 is in a standby state without displaying a broadcast image, the display device 1 may maintain a state of a black screen where no image is displayed. Alternatively, the display device 1 may operate in an ambient mode, for example, in which the black screen is maintained unless a user is detected during the standby state, but a preset standby image is displayed on the screen when a user is detected. Here, the display device 1 displays a standby image corresponding (or harmonized or matching) to the image of the accessory device 1300, thereby providing a more improved aesthetic environment to a user.

There are various methods by which the display device 1 obtains the data of the standby image corresponding to the image of the accessory device 1300. Below, one of the methods will be described. The accessory device 1300 includes a means for transmitting its own identification information. For example, the accessory device 1300 includes a mark 1321 such as a near field communication (NFC) tag or a quick response (QR) code on one surface thereof, and this mark 1321 indicates the identification information of that accessory device 1300. A mobile device 1810 may use its own sensor (for example, an NFC reader, a camera, etc.) to obtain the identification information from the mark 1321. The mobile device 1810 transmits the obtained identification information to a server 1820 that manages a user account and an electronic device. In this case, the mobile device 1810 may transmit user account information along with the identification information to the server 1820.

The server 1820 may identify a target display device 1 based on the user account information received from the mobile device 1810 (for example, identify the display device 1 that belongs to the same user account as the mobile device 1810). Further, the server 1820 identifies image data corresponding to the identification information received from the mobile device 1810. The server 1820 may include or obtain a database (DB) of various image data corresponding to the identification information, and obtain image data by searching the DB for the image data. The server 1820 transmits the obtained image data to the display device 1.

The display device 1 displays the standby image by processing the image data received from the server 1820. Thus, the display device 1 may display the standby image matching the image of the accessory device 1300 in the ambient mode.

In this embodiment, the mobile device 1810 obtains the identification information from the mark 1321. However, there are various ways of obtaining the identification information according to design. For example, a remote controller that belongs to the display device 1 may obtain the identification information.

Alternatively, the mobile device 1810 may transmit the obtained identification information to not the server 1820 but the display device 1. In this case, the display device 1 may transmit the identification information to the server 1820. Alternatively, the display device 1 may obtain image data from its own DB without using the server 1820.

Meanwhile, the display device 1 may perform the operations based on artificial intelligence (AI) provided therein. For example, the display device 1 may receive captured data of an image printed on the front surface of the accessory device 1300 from an external device including a camera. The display device 1 may use the AI to create a standby image corresponding (or matching) to the image of the captured data. The display device 1 may use at least one of machine learning, neural network, or deep learning algorithm as a rule based or AI algorithm to perform at least one of data analysis, processing, and result information generating for the foregoing operations.

For example, the processor of the display device 1 may function as a learner and a recognizer. The learner may perform a function of generating the trained neural network, and the recognizer may perform a function of recognizing (or inferring, predicting, estimating and identifying) the data based on the trained neural network. The learner may generate or update the neural network. The learner may obtain learning data to generate the neural network. For example, the learner may obtain the learning data from the storage of the display device 1 or from the outside. The learning data may be data used for training the neural network, and the data subjected to the foregoing operations may be used as the learning data for training the neural network.

Before training the neural network based on the learning data, the learner may perform a preprocessing operation with regard to the obtained learning data or select data to be used in the training among a plurality of pieces of the learning data. For example, the learner may process the learning data to have a preset format, apply filtering to the learning data, or process the learning data to be suitable for the training by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage of the display device 1 or from the outside. The target data may be data targeted to be recognized by the neural network. Before applying the target data to the trained neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The operations of the display device 1 corresponding to the identification information of the accessory device 1300 are not limited to the displaying of the standby image in the ambient mode. Below, such an embodiment will be described.

Figure 20:
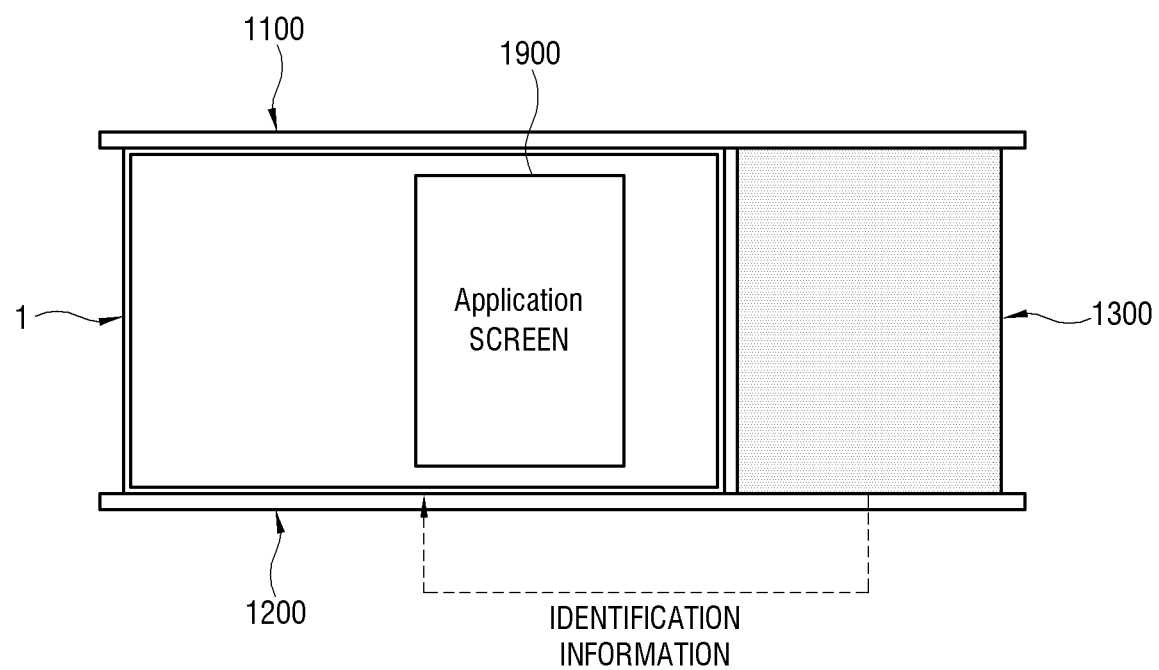
FIG. 20 illustrates an example that a display device executes an application corresponding to an accessory device.

FIG. 20 illustrates an example that a display device executes an application corresponding to an accessory device.

As shown in FIG. 20, the display device 1 and the accessory device 1300 are mounted to the frames 1100 and 1200. The mounting structure of the display device 1 and the accessory device 1300 is the same as described in the above embodiment. The accessory device 1300 according to this embodiment is implemented by various types of electronic devices such as a display device, and a loudspeaker.

When communication between the display device 1 and the accessory device 1300 is possible, the accessory device 1300 transmits the identification information to the display device 1. Alternatively, the accessory device 1300 may transmit the identification information to the display device 1 through a separate external device or communication hub. The display device 1 and the accessory device 1300 may communicate with each other based on various wireless communication standards such as Bluetooth, Bluetooth low energy (BLE), Zigbee, and Wi-Fi.

Alternatively, a contact point (or terminal, wiring, etc.) for communication between the accessory device 1300 and the display device 1 may be provided in the upper frame 1100 or the lower frame 1200. When the accessory device 1300 and the display device 1 are mounted to the frames 1100 and 1200, an interface terminal of the accessory device 1300 and an interface terminal of the display device 1 come into contact with the contact point, thereby allowing the accessory device 1300 and the display device 1 to communicate with each other through their own interface terminals and the contact point. In this way, the display device 1 may receive the identification information from the accessory device 1300 through the contact point.

The display device 1 may execute a preset application corresponding to the identification information of the accessory device 1300. For example, when the accessory device 1300 is identified as a loudspeaker, the display device 1 executes a multimedia playback application to display an application screen 1900 for controlling audio playback. Alternatively, the accessory device 1300 is identified as a display device, the display device 1 transmits image data to the accessory device 1300. For example, when a content image and a control menu are displayed, the display device 1 transfers the control menu to the screen of the accessory device 1300. Alternatively, when a plurality of content images are displayed, the display device 1 transfers some content images to the screen of the accessory device 1300.

In this way, the display device 1 performs a corresponding operation based on the identification information of the accessory device 1300.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product.

What is claimed is:

1. An apparatus for a display device, comprising:
   an upper frame including:
      a first mounting portion coupleable to an upper portion of the display device, and
      a second mounting portion coupleable to an upper portion of an accessory device, the first mounting portion and the second mounting portion configured to support the display device and the accessory device side by side in a lengthwise direction on the upper frame; and
   a lower frame arrangeable to be spaced apart from the upper frame, the lower frame including:
      a first mounting portion coupleable to a lower portion of the display device, and
      a second mounting portion coupleable to a lower portion of the accessory device.

2. The apparatus of claim 1, further comprising a device bracket comprising a first end coupleable to the display device, and a second end coupleable to the first mounting portion of the upper frame.

3. The apparatus of claim 2, wherein the device bracket comprises:
   a bracket main body forming a device coupling portion fastenable to the upper frame by a screw to allow the display device to be coupled to the upper frame while the screw is passed along a hole of a rear surface of the display device, and
   a bracket mounting portion coupleable to an end portion of the bracket main body and coupleable to the first mounting portion of the upper frame such that while the bracket mounting portion is coupled, the bracket mounting portion is rotatable.

4. The apparatus of claim 3, wherein
   the first mounting portion of the upper frame is shaped as a hook, and
   the bracket mounting portion is shaped as a ring to allow the first mounting portion of the upper frame to be hooked.

5. The apparatus of claim 1, wherein the upper frame or the lower frame comprises:
   a frame main body; and
   a spacer protruding from the frame main body to form a space between the frame main body and the display device.

6. The apparatus of claim 5, wherein the upper frame or the lower frame further comprises a frame bending portion bent from the spacer to cover a horizontal edge of the display device.

7. The apparatus of claim 1, wherein the accessory device comprises:
   a first accessory member supportable on the second mounting portion and comprising a first coupling portion; and
   a second accessory member comprising a second coupling portion coupleable to and decoupleable from the first coupling portion of the first accessory member.

8. The apparatus of claim 7, wherein
   the first coupling portion of the first accessory member comprises a magnet coupleable to a surface thereof, and
   the second coupling portion of the second accessory member comprises a metal material to be attached to the magnet.

9. The apparatus of claim 7, wherein the second accessory member comprises a mark that represents identification information of the accessory device.

10. The apparatus of claim 1, wherein
    the upper frame arranged at a first position corresponding to an upper edge of the display device, and the lower frame is arranged at a second position corresponding to a lower edge of the display device, and
    the upper frame and the lower frame are arranged to have up and down symmetry.

11. The apparatus of claim 10, wherein the upper frame and the lower frame are spaced apart by a distance that corresponds to a vertical length of the display device.

12. The apparatus of claim 10, further comprising one or more bars supportable on the upper frame and the lower frame, and adjustable in length corresponding to a vertical length of the display device.

13. The apparatus of claim 1, further comprising a device bracket coupleable to the display device,
the device bracket comprising:
a bracket main body coupleable to a rear surface of the display device, and
a bracket mounting portion having a length corresponding to a vertical length of the display device, and comprising opposite ends supportable on the upper frame and the lower frame, respectively.

14. The apparatus of claim 1, wherein the upper frame or the lower frame comprises holes using which the upper frame or the lower frame is coupleable to a wall by screws.

15. The apparatus of claim 1, wherein
the upper frame or the lower frame is extended along a horizontal direction, and
the first mounting portion of the upper frame or the first mounting portion of the lower frame, or the second mounting portion of the upper frame or the second mounting portion of the lower frame are spaced apart to have bilateral symmetry relative to each other.

\* \* \* \* \*